(12) United States Patent
Yamamoto et al.

(10) Patent No.: US 7,842,240 B2
(45) Date of Patent: Nov. 30, 2010

(54) MICROCHIP FOR ANALYSIS, ANALYSIS SYSTEM HAVING THE SAME, AND ANALYSIS METHOD

(75) Inventors: Minao Yamamoto, Chiba (JP); Masataka Shinogi, Chiba (JP)

(73) Assignee: Seiko Instruments Inc. (JP)

( * ) Notice: Subject to any disclaimer, the term of this patent is extended or adjusted under 35 U.S.C. 154(b) by 1240 days.

(21) Appl. No.: 11/121,321

(22) Filed: May 3, 2005

(65) Prior Publication Data

US 2005/0255000 A1 Nov. 17, 2005

(30) Foreign Application Priority Data

May 6, 2004 (JP) .............................. 2004-137804
Mar. 23, 2005 (JP) .............................. 2005-083781

(51) Int. Cl.
*G01N 15/06* (2006.01)
*B01L 99/00* (2010.01)
*F01N 3/28* (2006.01)
*G05D 7/00* (2006.01)

(52) U.S. Cl. ...................... 422/68.1; 422/103; 422/107; 422/110

(58) Field of Classification Search ................ 422/68.1, 422/103, 107, 110
See application file for complete search history.

(56) References Cited

U.S. PATENT DOCUMENTS

| | | | |
|---|---|---|---|
| 4,673,657 A * | 6/1987 | Christian | 436/501 |
| 5,836,750 A * | 11/1998 | Cabuz | 417/322 |
| 6,444,461 B1 | 9/2002 | Knapp et al. | |
| 6,537,501 B1 * | 3/2003 | Holl et al. | 422/101 |
| 2002/0128593 A1 | 9/2002 | Sjolander et al. | 604/22 |
| 2003/0134431 A1 | 7/2003 | Parce et al. | |

(Continued)

FOREIGN PATENT DOCUMENTS

WO   WO-03/018753 A   3/2003

(Continued)

OTHER PUBLICATIONS

Kaori Morimoto, "A plasmon resonance analysis type analysis apparatus," Clinical Examination (Igaku-Shoin, Ltd.), Oct. 2003, vol. 47, No. 11, Special Issue for 2003, p. 1319-1327.

(Continued)

*Primary Examiner*—Lore Jarrett
(74) *Attorney, Agent, or Firm*—Adams & Wilks

(57) ABSTRACT

A microchip has a substrate on which there are formed a reaction bath section, a first flow channel to which are connected a supply channel that supplies a buffer solution and the reaction bath section, a second flow channel to which are connected a supply channel that supplies a sample solution containing a first substance and a channel that discharges the sample and buffer solutions to an exterior of the substrate, and a connecting channel connecting the first flow channel to the second flow channel. The reaction bath section receives the first and second substances so that the first and second substances react in the reaction bath section. The first and second flow channels are provided with valves disposed relative to the connecting channel such that selective opening and closing of the valves causes the buffer solution to flow first into the reaction bath section at a preselected speed and the sample solution to flow second into the reaction bath section at the preselected speed to cause the first and second substances to react in the reaction bath section.

33 Claims, 19 Drawing Sheets

U.S. PATENT DOCUMENTS

2003/0186295 A1* 10/2003 Colin et al. .................. 435/6
2004/0011650 A1   1/2004 Zenhausern et al.
2004/0115094 A1* 6/2004 Gumbrecht et al. .......... 422/58
2006/0008382 A1* 1/2006 Salamitou et al. ............ 422/57
2006/0257854 A1* 11/2006 McDevitt et al. ............. 435/5

OTHER PUBLICATIONS

Kazuhiro Nagata and Hiroshi Handa, "Real-Time Analysis of Biomolecular Interactions," Springer-Verlag, Tokyo, Nov. 1998.

* cited by examiner

MICROCHIP FOR ANALYSIS, ANALYSIS SYSTEM HAVING THE SAME, AND ANALYSIS METHOD

BACKGROUND OF THE INVENTION

1. Field of the Invention

The present invention relates to a microchip for analysis which is used for an analysis of biomolecular interactions or the like, an analysis system having the same, and an analysis method.

2. Description of the Related Art

Conventionally, in order to analyze a biomolecular interaction such as protein or the like, an analysis method in which, for example, an analyte is bound to a ligand and the state of binding reaction (for example, binding strength, binding rate, etc.) is detected using a phenomenon of surface plasmon resonance (SPR) is known. In particular, analysis apparatuses as described in Non-Patent Documents 1 and 2 have been widely used.

An example of such an analysis method will be described in summary. A ligand is preliminarily modified on a base layer (metal film) of a reaction bath section, a sample solution containing an analyte is supplied to the reaction bath section with a predetermined amount at a predetermined rate to allow a binding reaction between the ligand and the analyte, and light is irradiated onto the base layer of the reaction bath section, which results in surface plasmon resonance. Further, since a dielectric constant of the base layer changes according to the binding reaction between the ligand and the analyte and there occurs a phase shift in the resonance signal, the relationship between the reaction time and the state of binding can be determined by measuring the phase shift. In addition, based on the above-described relationship, identification of specific intermolecular binding, screening of substances that are unknown of whether they undergo binding, ranking of the binding strength among molecules, quantification of analyte concentration, calculation of dissociation constant, calculation of kinetics constant or the like can be performed.

FIG. 16 schematically shows such an analysis apparatus. In the analysis apparatus, a sample solution supply channel 103 to which a sample solution vessel 101A for storing sample solution containing analyte is connected via a pump 102A is connected to a reaction bath section 105, in which a binding reaction is performed, via a large-volume fixed-quantity storage section 104. In particular, the fixed-quantity storage section 104 and the reaction bath section 105 are schematically shown. Valves 106A and 106B are respectively disposed upstream and downstream of the fixed-quantity storage section 104; Further, the reaction bath section 105 is connected to a waste solution tank 107. On the other hand, a buffer solution supply channel 108 to which a buffer solution vessel 101B for storing buffer solution is connected via a pump 102B is connected between the valve 106A of the sample solution supply channel 103 and the fixed-quantity storage section 104 via a valve 106C. Then, a waste solution channel 109 which is linked to the waste solution tank 107 is connected between the fixed-quantity storage section 104 and the valve 106B downstream thereof via a valve 106D.

An analysis method using the analysis apparatus will be specifically described with reference to a flowchart in FIG. 17. First, a ligand is preliminarily modified in the reaction bath section 105 (Step 201). Then, the extraction of air is performed to discharge air in each flow channel. For example, the extraction of air from the buffer solution supply channel 108, the fixed-quantity storage section 104, and the reaction bath section 105 is performed by closing the valves 106A and 106D, opening the valves 106C and 106B, and operating the pump 102B to flow the buffer solution from the buffer solution vessel 101B to the waste solution tank 107 via the buffer solution supply channel 108, the fixed-quantity storage section 104, and the reaction bath section 105 (Step 202). Subsequently, the-extraction of air from the sample solution supply channel 103, the fixed-quantity storage section 104, and the waste solution channel 109 is performed by closing the valves 106C and 106B, opening the valves 106A and 106D, and operating the pump 102A to flow the sample solution from the sample solution vessel 101A to the waste solution tank 107 via the sample solution supply channel 103, the fixed-quantity storage section 104, and the waste solution channel 109 (Step 203). In such a manner, the extraction of air from the flow channels is completed. Further, at the time when a predetermined quantity (for example, 50 μl) of sample solution remains in the fixed-quantity storage section 104, the valve 106A is closed and the valve 106C is opened. Then, the valve 106D is closed, the valve 106B is opened, and the pump 102B is operated to transfer the buffer solution to the buffer solution supply channel 108. Thus, the sample solution in the fixed-quantity storage section 104 is purged therefrom by the buffer solution (Step 204). When the purged sample solution passes through the reaction bath section 105, the ligand modified in the reaction bath section 105 undergoes a binding reaction with the analyte in the sample solution. Then, by measuring a resonance signal resulting at that time by an optical method or the like, the state of reaction is detected (Step 205). Further, the quantity of the sample solution used in the analysis is 50 μl as stored in the fixed-quantity storage section 104, the reaction time is, for example, from 5 to 50 minutes, and the flux of the sample solution by the operations of the pumps 106A and 106B is from 1 to 10 μl/min.

FIG. 18 shows an example of measuring the resonance signal when the binding reaction is actually performed by the above-described analysis method. In this example, when the sample solution begins to flow in the reaction bath section 105 while the buffer solution is still flowing in the reaction bath section 105, the change in phase of the resonance signal increases, thus indicating the initiation of the binding between the analyte and the ligand. However, after a while, equilibrium in concentration is reached, and binding does not occur between analyte and ligand so much, such that the change in phase of the resonance signal is stopped. Then, when the supply of a predetermined quantity of sample solution is completed and when the buffer solution is supplied again to the reaction bath section 105, a part of the bound analyte-ligand undergoes dissociation, thereby decreasing the change in phase of the resonance signal. The detection of the dissociation state is effective in, for example, knowing the binding strength between the analyte and the ligand. Thereafter, though not shown in FIGS. 16 and 17, a regeneration solution, instead of the buffer solution, is supplied to the reaction bath section 105 to purge all analyte by dissociating it from the ligand and the ligand in the reaction bath section 105 is brought into a reusable state.

The reaction bath section 105 in the above-described analysis apparatus according to a related art has a configuration in which a window 100a is provided on a substrate 100 and the window 100a is covered by a sensor chip 110 (see FIGS. 19 and 20). Further, the ligand is modified in the sensor chip 110 which serves as a lid. In this configuration, the reaction state is examined by irradiating a light beam from an optical means (not shown in FIG. 18) outside the substrate 100 to be reflected. That is, since the binding reaction between the ligand and the analyte causes a change in the dielectric constant and thus in the refractive index of light in the base layer, the detection of the reflection of incident light can give information on the state of binding reaction. Further, if the reaction bath section 105 where the reaction and the analysis are performed has a configuration in which the window 100a is opened on the substrate 100, as shown in FIG. 19, the vertical spacing d in the reaction bath section 105 is larger than other parts, and thus it is difficult to obtain a desired spacing (for example, 50 μm). In addition, there may be stagnation in the flow of a fluid around a corner portion 105a. Thus, it is impossible to obtain a uniform flow and there is possibility that a complete extraction of air is not achieved, with residual air still remaining. Therefore, as shown in FIG. 20, a so-called "flow cell" morphology can be employed so as to reduce the spacing d in the reaction bath section 105, such that a uniform flow can be achieved without stagnation. At the same time, the analyte in the sample solution can be allowed to flow around the ligand-modified sensor chip 110 so as to increase the probability for the analyte to come into contact with the ligand, thus leading to an efficient binding reaction.

[Patent Document 1] US Patent Application Publication No. 2002/0128593

[Non-Patent Document 1] Kaori Morimoto, "A plasmon resonance analysis type analysis apparatus," Clinical Examination (Igaku-Shoin, Ltd.), October 2003, Vol. 47, No. 11, Special Issue for 2003, p. 1319-1327

[Non-Patent Document 2] Kazuhiro Nagata and Hiroshi Handa, "Real-Time Analysis of Biomolecular Interactions," Springer-Verlag, Tokyo, November 1998

According to the above-described analysis method of the related art, the predetermined quantity (for example, 50 μl) of the sample solution is stored in the fixed-quantity storage section 104 and the sample solution is supplied to the reaction bath section 105 by purging with the buffer solution. In this case, since the fixed-quantity storage section 104 is required to be of a large capacity, it is difficult to form each flow channel of the analysis apparatus on a minute microchip and a relatively large substrate 100 is needed, thereby enlarging the analysis apparatus as a whole. Further, since the substrate 100 is large and expensive and the sample solution vessel 101A and the pump 102A, and the buffer solution vessel 101B and the pump 102B are connected to the sample solution supply channel 103 and the buffer solution supply channel 108 on the substrate 100, respectively, mounting or removal is not easy. Thus, in consideration of the complexity of the operation and the increase in the product cost, it has been difficult in practice to replace the substrate 100 with a disposable one.

Since it has been difficult so far in practice to use and discard the substrate 100, the substrate 10 has been used repeatedly in a variety of analyses. In that case, even though the flow channels or the pumps are cleaned with a cleaning solution, there still is a risk that the analyte in the sample solution of the previous analysis remains somehow in the flow channels or the pumps to possibly react with the sample solution for the subsequent analysis, thereby lowering reliability of analysis. Further, in the case of supplying the sample solution to the reaction bath section 105 by purging with the buffer solution, there is a risk that both solutions may diffuse into each other at an interface, thus making the point of completion of the reaction unclear, or making the concentration of the sample solution inaccurate, to impair reliability of the analysis result. In addition, it is difficult in practice to use and discard the substrate 100 and the substrate 100 should be used repeatedly in a number of analyses. Thus, as described above, a configuration in which a part of the reaction bath section 105 is constituted by a separable sensor chip 110 and the sensor chip 110 is modified with the ligand is adopted. Accordingly, the above-described flow cell structure is generally used (see FIG. 20).

SUMMARY OF THE INVENTION

Thus, it is an object of the invention to provide a microchip for analysis which has a morphology of a microchip with a miniaturized substrate, which requires low production cost due to facilitated preparation or assembling, which is disposable, making it easy to use, and which eliminates a risk of contamination in flow channels, an analysis system having the microchip for analysis, and an analysis method using the same.

According to a first aspect of the invention, there is provided a microchip for analysis which, on a substrate, is provided with a reaction bath section, a sample solution supply channel for supplying sample solution for analysis, a buffer solution supply channel for supplying buffer solution, and a waste solution channel for discharging the solutions to an outside. The microchip for analysis includes a first flow channel to which the buffer solution supply channel and the reaction bath section are connected, a second flow channel to which the sample solution supply channel and the waste solution channel are connected, and a connecting channel which is connected to an upstream side of the reaction bath section of the first flow channel from the second flow channel.

The connecting channel may be a flow channel which allows the buffer solution to flow from the buffer solution supply channel to the waste solution channel and which allows the sample solution to flow from the sample solution supply channel to the reaction bath section. That is, the connecting channel is the flow channel which enables a fluid to alternately flow in counter directions.

According to this configuration, since a fixed-quantity storage section to store the entity of the sample solution to be used in the reaction is not needed, the flow channel configuration on the substrate can be made very simple as well as compact, and thus a miniaturized configuration which is referred to as a so-called microchip can be implemented.

The sample solution supply channel may be provided with a sample solution introducing port onto which the sample solution is dropped and supplied. The buffer solution supply channel may be provided with a buffer solution introducing port onto which the buffer solution is dropped and supplied or may be connected to a buffer solution tank storing the buffer solution. According to the configuration of the invention, since it is not needed to provide a pump for supplying the sample solution on the sample solution supply channel or a pump for supplying the buffer solution on the buffer solution supply channel, as regards at least the sample solution, the solution can be dropped onto a cup-shaped introducing section. Accordingly, the operations of connecting the supply channels for the respective solution can be simplified.

The second flow channel may be provided with valves that are respectively disposed upstream and downstream of the connecting channel, and the first flow channel may be provided with valves that are respectively disposed upstream and downstream of a portion to which the connecting channel is connected. By opening and closing of these valves, the operation of extracting air from the flow channels or of initiating the reaction for analysis can be easily performed. Moreover, the configuration is relatively simple.

The waste solution channel may be connected to a waste solution tank outside the substrate. The reaction bath section may be connected to the waste solution tank. Further, a pump which sucks up a fluid from at least one of the waste solution channel and the reaction bath section is connected to the waste solution tank. According to this configuration, it is preferable because only a single pump is needed. Further, since the pump is disposed downstream of the reaction bath section, there is no risk that contamination by any residual solution in the pump may adversely affect the analysis.

If a temperature adjusting section which adjusts a temperature of the fluid is provided in the reaction bath section of the first flow channel or upstream of the reaction bath section, it is possible to supply the sample solution to the reaction bath section while maintaining the sample solution at a predetermined temperature and to perform the reaction under predetermined conditions. The temperature adjusting section is preferably provided downstream of the valve which is disposed upstream of the reaction bath section of the first flow channel.

The microchip for analysis may further include a third flow channel to which another buffer solution supply channel for supplying the buffer solution and the reaction bath section are connected, a fourth flow channel to which a treatment solution supply channel for supplying treatment solution and the waste solution channel are connected, and a connecting channel for treatment solution which is connected to an upstream side of the reaction bath section of the third flow channel from the fourth flow channel. Another buffer solution supply channel of the third flow channel may be a flow channel which is branched from the buffer solution supply channel of the first flow channel to reach the reaction bath section. The connecting channel for treatment solution may be a flow channel which allows the buffer solution to flow from the buffer solution supply channel to the waste solution channel and which allows the treatment solution to flow from the treatment solution supply channel to reach the reaction bath section. That is, the connecting channel for treatment solution maybe a flow channel in which the fluid can flow alternately in counter directions. The fourth flow channel may be provided with valves which are respectively disposed upstream and downstream of the connecting channel for treatment solution, and the third flow channel may be provided with valves which are respectively disposed upstream and downstream of a portion to which the connecting channel for treatment solution is connected. Further, at least one other flow channel for treatment solution may be connected to the fourth flow channel.

If such a microchip for analysis is constituted to be disposable with use of one time, there is no need of employing the flow cell structure as in the related art, and the configuration of the reaction bath section becomes simple.

According to a second aspect of the invention, an analysis system includes the microchip for analysis having any one configuration as described above, a mounting section on which the microchip for analysis is mounted, a solution transfer section which causes at least the sample solution and the buffer solution to flow in the microchip for analysis mounted on the mounting section, a sensor section which detects a reaction in the reaction bath section, and an analysis section which analyzes the detection result from the sensor section.

The sensor section may be built in the reaction bath section of the microchip for analysis.

The analysis section may be included in a computer which controls operations of the valve provided on the microchip for analysis and of the pump connected to the microchip for analysis.

According to a third aspect of the invention, there is provided an analysis method using a microchip for analysis which has a reaction bath section, a sample solution supply channel for supplying sample solution for analysis, a buffer solution supply channel for supplying buffer solution, a waste solution channel for discharging the solutions to an outside, a first flow channel to which the buffer solution supply channel and the reaction bath section are connected, a second flow channel to which the sample solution supply channel and the waste solution channel are connected, and a connecting channel which is connected to an upstream side of the reaction bath section of the first flow channel from the second flow channel. The analysis method includes a step of extracting air from the sample solution supply channel and the waste solution channel by allowing the sample solution to flow from the sample solution supply channel via the waste solution channel to the outside, a step of extracting air from the buffer solution supply channel, the connecting channel, and the waste solution channel by allowing the buffer solution to flow from the buffer solution supply channel via the connecting channel and the waste solution channel to the outside, a step of extracting air from the buffer solution supply channel and the reaction bath section by allowing the buffer solution to flow from the buffer solution supply channel via the reaction bath section to the outside, and a step of, after the respective steps of extracting air are completed, supplying the sample solution to the reaction bath section from the sample solution supply channel via the connecting channel and causing and detecting a chemical reaction of the sample solution in the reaction bath section. According to this method, a variety of analyses can be performed continuously and efficiently, using a disposable microchip for analysis.

The order of performing the above-described three steps of extracting air is not particularly limited. However, when the step of supplying the sample solution to the reaction bath section to cause and detect the chemical reaction may be started while a flow in the reaction bath section is maintained by allowing the buffer solution to continuously flow to the reaction bath section. That is, if the buffer solution is allowed to continuously flow in the reaction bath section not to cause a flow in the reaction bath section to be stopped till the step, it is possible to prevent the condition of the flow from fluctuating during the chemical reaction and thus being unstable, such that reliability of analysis can be enhanced. Further, to this end, when the step of extracting air from the buffer solution supply channel, the connecting channel and the waste solution channel and/or the step of extracting air from the sample solution supply channel and the waste solution channel are performed after the step of extracting air from the buffer solution supply channel and the reaction bath section, the analysis method may further include a step of allowing the buffer solution to flow in the first flow channel after the respective steps of extracting air are completed and before the step of supplying the sample solution to the reaction bath section to cause and detect the chemical reaction.

The step of supplying the sample solution to the reaction bath section to cause and detect the chemical reaction may be performed while adjusting the temperature of the sample solution by means of a temperature adjusting section provided in the reaction bath section of the first flow channel or upstream of the reaction bath section. As such, the reaction can be performed under predetermined conditions by supplying the sample solution into the reaction bath section at a predetermined temperature. The temperature adjusting section is preferably provided downstream of the valve which is disposed upstream of the reaction bath section of the first flow channel. Further, operation conditions for the temperature adjusting section may be preliminarily set when the buffer solution is flowing in the reaction bath section, before the step of supplying the sample solution to the reaction bath section to cause and detect the chemical reaction. Then, the sample solution can be maintained stable at an appropriate temperature from the time when the sample solution begins to flow to bring into the chemical reaction, thus reliability of analysis can be enhanced.

The sample solution may be supplied by dropping the sample solution on a sample solution introducing port which is provided on the sample solution supply channel and the buffer solution may be supplied by dropping the buffer solution on a buffer solution introducing port which is provided on the buffer solution supply channel. In such a manner, there is no need to provide a pump on the sample solution supply channel and the buffer solution supply channel, such that the configuration is simplified.

Both a fluid discharged from the waste solution channel and a fluid discharged from the reaction bath section may be caused to flow in a waste solution tank which is provided outside the substrate and which is connected to the waste solution channel and the reaction bath section. Then, the discharged fluids can be efficiently handled by means of a simple configuration.

Flows of the buffer solution and the sample solution may be controlled by open and close operations of each of valves respectively provided upstream and downstream of the connecting channel of the second flow channel, open and close operations of each of valves respectively provided upstream and downstream of a portion of the first flow channel to which the connecting channel is connected, and an operation of a pump for a fluid sucking-up connected to the waste solution tank. Then, various operations required for the analysis can be performed by simple manipulation, and thus automatization is possible.

The above-described analysis method is particularly effective in a case in which the ligand is preliminarily modified in the reaction bath section and in which the sample solution containing the analyte is supplied to the reaction bath section to cause and detect the chemical reaction.

Whenever the step of supplying the sample solution to the reaction bath section to cause and detect the chemical reaction is completed, a step of removing the microchip for analysis to replace with a new microchip for analysis may be performed. If the microchip for analysis is used and discarded, it is not necessary to use the flow cell structure as in the related art. Thus, the configuration of the reaction bath section is simplified, and a variety of analyses can be performed efficiently.

The analysis method may further include, using the microchip for analysis further having a third flow channel to which another buffer solution supply channel for supplying the buffer solution and the reaction bath section are connected, a fourth flow channel to which a treatment solution supply channel for supplying treatment solution and the waste solution channel are connected, and a connecting channel for treatment solution which is connected to an upstream side of the reaction bath section of the third flow channel from the fourth flow channel, a step of allowing the buffer solution to flow from the buffer solution supply channel to the waste solution channel via the connecting channel for treatment solution, and a step of allowing the treatment solution to flow from the treatment solution supply channel to the reaction bath section via the connecting channel for treatment solution. Another buffer solution supply channel of the third flow channel may be a flow channel which is branched from the buffer solution supply channel of the first flow channel to reach the reaction bath section. The analysis method may further include, using the microchip for analysis having at least one other flow channel for treatment solution connected to the fourth flow channel, a step of allowing another treatment solution to flow from the other flow channel for treatment solution to the reaction bath section via the connecting channel for treatment solution.

According to the invention, a miniaturized microchip for analysis can be used to perform a variety of analyses continuously with a simple configuration. In particular, since the production cost is reduced or the connection operation is simplified, it is possible to facilitate the use of a disposable microchip for analysis, which had been difficult in practice in the related art. Further, since the supply of the buffer solution or the sample solution is facilitated, it is also possible to reduce the number of pumps and to eliminate any adverse effect on analysis due to contamination in the pump.

DETAILED DESCRIPTION OF THE PREFERED EMBODIMENT

Hereinafter, embodiments of the invention will be described with reference to the drawings.

First Embodiment

Figure 1:
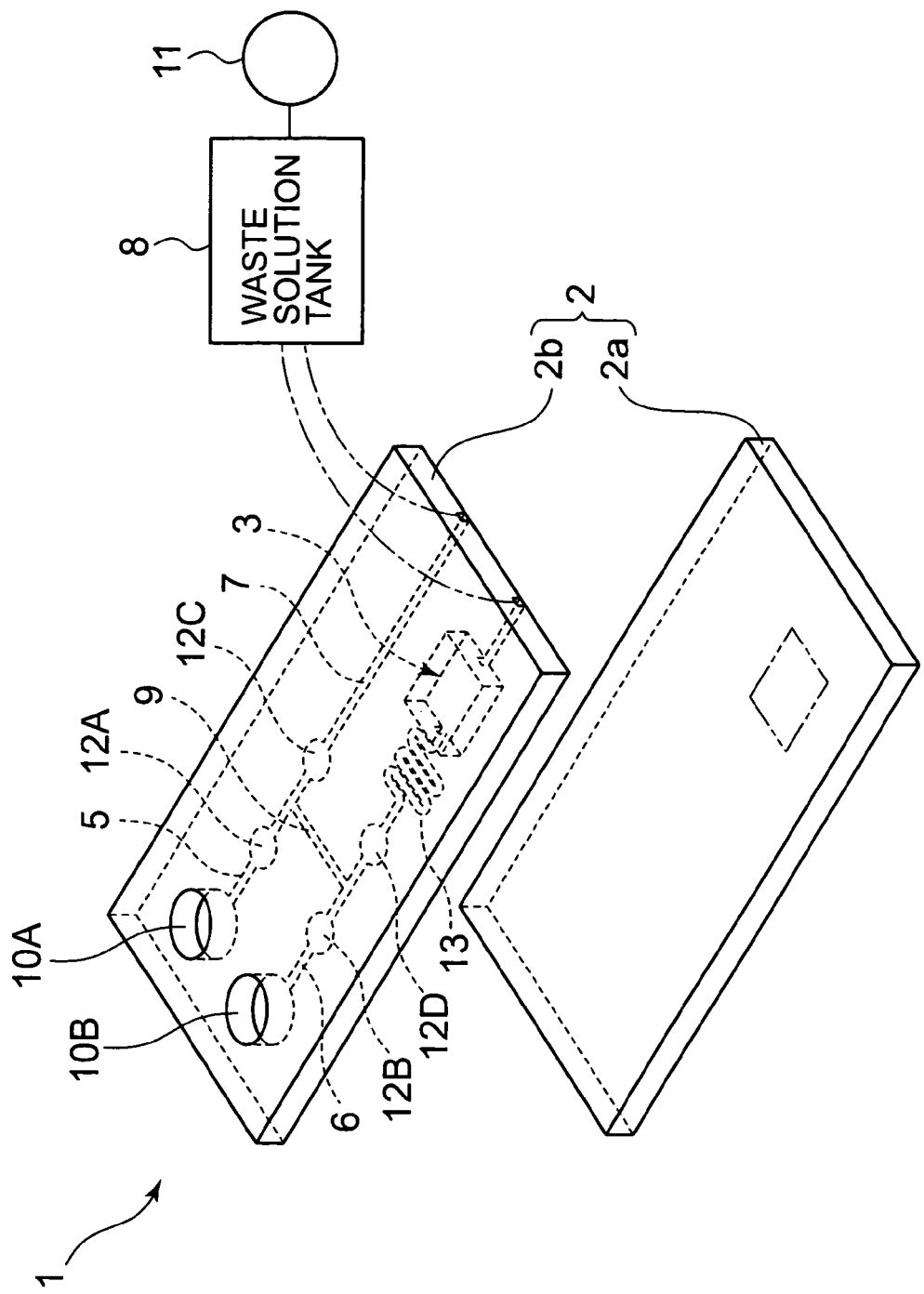
FIG. 1 is an exploded perspective view of a microchip for analysis and elements thereof in an analysis apparatus according to a first embodiment of the invention.
Figure 2:
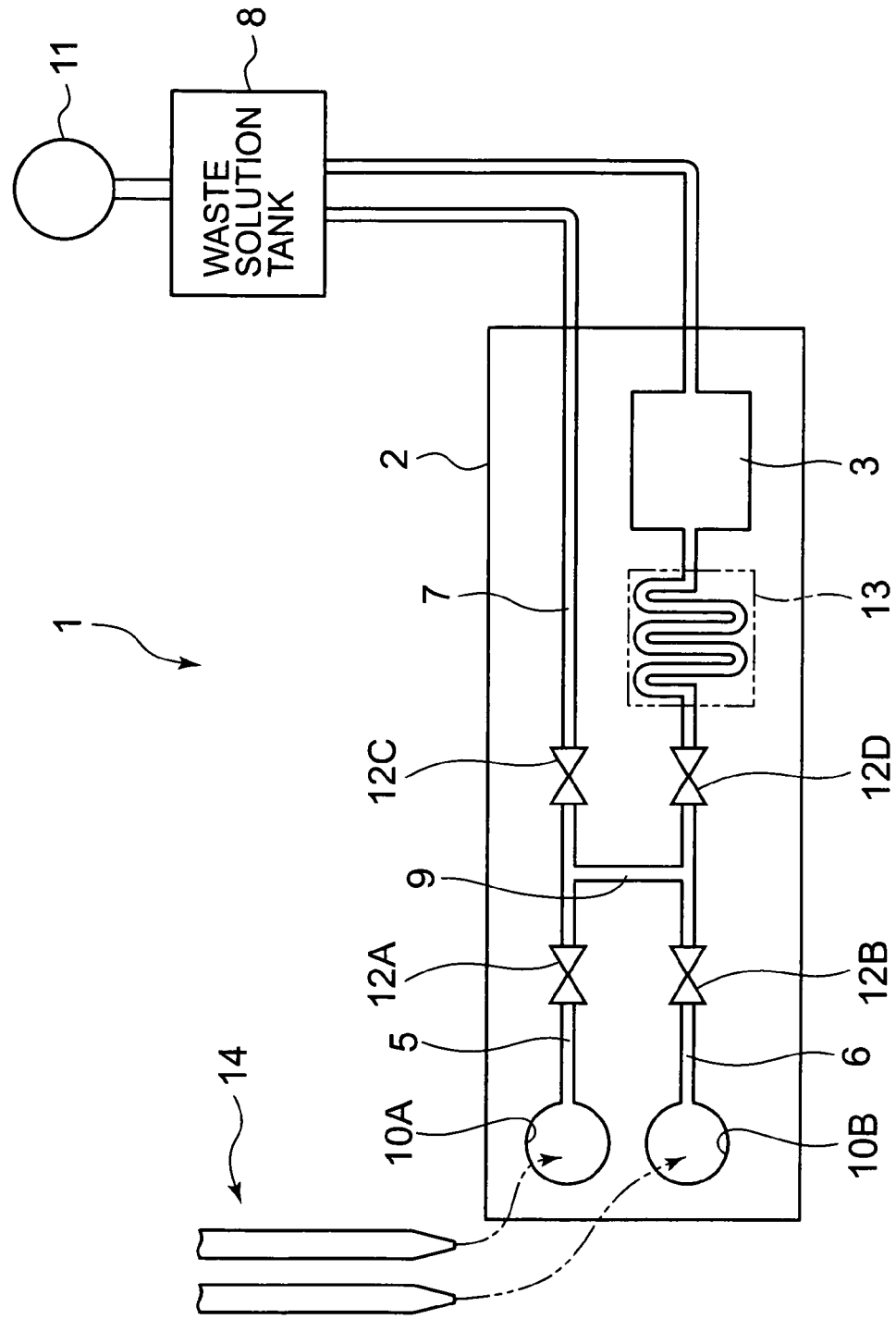
FIG. 2 is a schematic plan view of the microchip for analysis and the elements thereof shown in FIG. 1.

FIG. 1 is an exploded perspective view of a microchip for analysis 1 of the invention, and FIG. 2 is a schematic plan view of the microchip for analysis 1 of the invention. The microchip for analysis 1 of the invention is to analyze interactions of biomolecules such as protein, and in particular, to detect the state of binding reaction (for example, binding strength, binding rate, dissociation constant, and the like) between a ligand and an analyte.

The microchip for analysis 1 is provided with, on a minute substrate 2 having two plate members 2a and 2b laminated one on other, a reaction bath section 3 where a reaction is performed by mainly forming a concave portion in one plate member 2b by using photolithography or the like, a sample solution supply channel 5 which supplies a sample solution for analysis, a buffer solution supply channel 6 which supplies a buffer solution having functions of cleaning flow channels or of buffering (function of dissociation), and a waste solution channel 7 which reaches to a waste solution tank 8 provided outside the substrate 2. Specifically, the buffer solution supply channel 6 and the reaction bath section 3 are connected to form a first flow channel, and the sample solution supply channel 5 and the waste solution channel 7 are connected to form a second flow channel. In addition, a connecting channel 9 which is connected to an upstream side of the reaction bath section 3 of the first flow channel from the second flow channel is provided.

At an end of the sample solution supply channel 5 (the end opposite to the waste solution channel 7), a cup-shaped port 10A for introducing the sample solution onto which the sample solution is dropped and supplied is provided. Likewise, at an end of the buffer solution supply channel 6 (the end opposite to the reaction bath section 3), a cup-shaped port 10B for introducing the buffer solution onto which the buffer solution is dropped and supplied is provided. Meanwhile, the waste solution channel 7 and the reaction bath section 3 are respectively connected to a waste solution tank 8 which is provided outside the substrate 2, and a pump 11 is connected to the waste solution tank 8. The pump 11 can suck up fluids from the waste solution channel 7 and the reaction bath section 3.

The second flow channel having the sample solution supply channel 5 and the waste solution channel 7 is provided with a valve 12A which is provided upstream of the connecting channel 9 and a valve 12C which is provided downstream of the connecting channel 9. Further, the first flow channel having the buffer solution supply channel 6 and the reaction bath section 3 is provided with a valve 12B which is provided upstream of a portion to which the connecting channel 9 is connected and a valve 12D which is provided downstream of a portion to which the connecting channel 9 is connected. Between the valve 12D and the reaction bath section 3 is provided with a temperature adjusting section 13 which can adjust the temperature of the fluid.

An example of an analysis method of the invention using the microchip for analysis 1 will be described specifically with reference to a flowchart in FIG. 3. First, the ligand is preliminarily modified in the reaction bath section 3 (Step 21). Specifically, as shown in FIG. 4A, in the reaction bath section 3, the substrate 2 is modified with the ligand on the base layer 2C which includes a gold layer or the like.

Figure 5A:
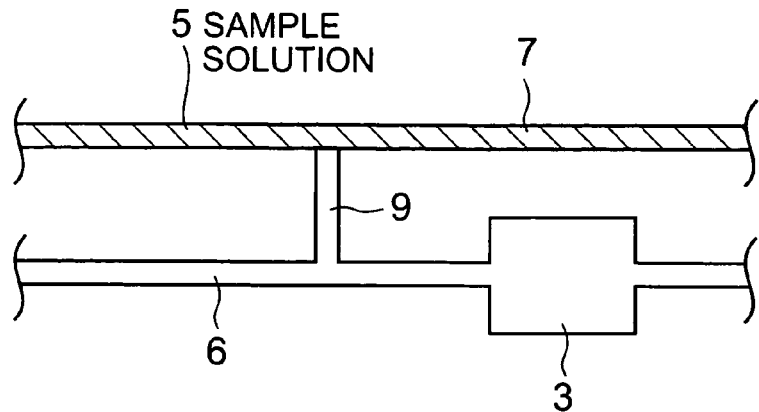
FIGS. 5A-5C are an explanatory view schematically showing the state of a fluid in each flow channel according to the analysis method shown in FIG. 3.
Figure 5B:
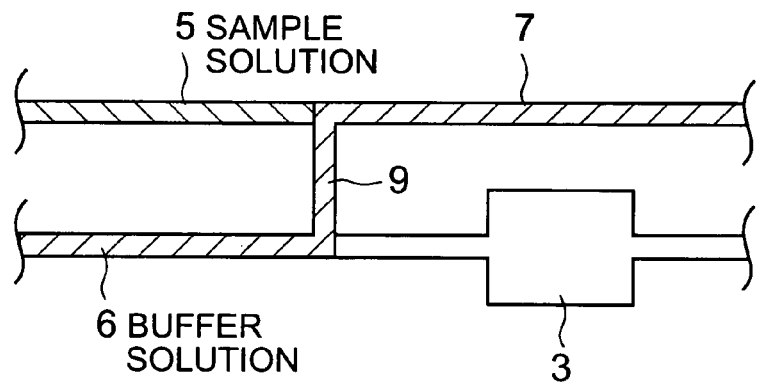
Figure 5C:
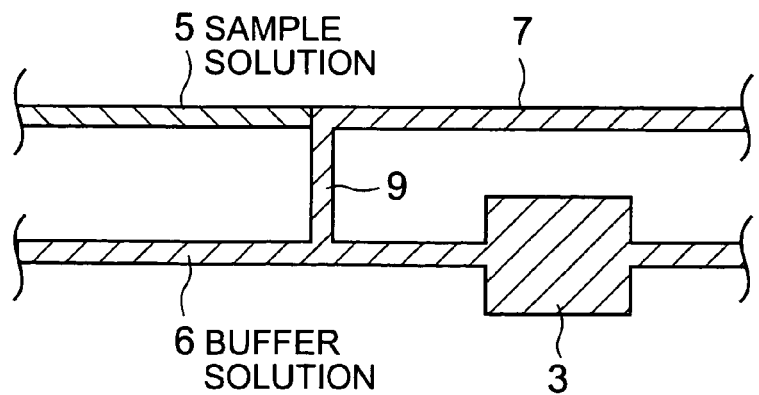

Subsequently, an extraction of air is performed to discharge air in each flow channel. The buffer solution is dropped onto the buffer solution introducing port 10B and the sample solution is dropped onto the sample solution introducing port 10A. Then, the valves 12B and 12D are closed, the valves 12A and 12C are opened, and the pump 11 is operated. In such a manner, the sample solution dropped on the sample solution introducing port 10A is forced into the waste solution tank 8 via the sample solution supply channel 5 and the waste solution channel 7, in order to extract air from the sample solution supply channel 5 and the waste solution channel 7 (Step 22) and to fill the channels with the sample solution as shown in FIG. 5A. Next, by closing the valve 12A and opening the valve 12B, the buffer solution dropped on the buffer solution introducing port 10B is forced into the waste solution tank 8 via the buffer solution supply channel 6, the connecting channel 9, and the waste solution channel 7, in order to extract air from the buffer solution supply channel 6, the connecting channel 9, and the waste solution channel 7 (Step 23). In addition, although there is no air remaining in the waste solution channel 7 which is filled with the sample solution, in the step 23, the sample solution is purged with the buffer solution, and the buffer solution supply channel 6, the connecting channel 9, and the waste solution channel 7 are filled with the buffer solution, as shown in FIG. 5B. Then, by closing the valve 12C and opening the valve 12D, the buffer solution from the buffer solution supply channel 6 is led to the reaction bath section 3 and also forced into the waste solution tank 8. In such a manner, the extraction of air from the reaction bath section 3 and the flow channel connected thereto is performed (Step 24), and the reaction bath section 3 is also filled with the buffer solution, as shown in FIG. 5C. Thus, the extraction of air from each of the flow channels is completed. At this point, to summarize, the sample solution supply channel 5 is filled with the sample solution, and the buffer solution supply channel 6, the connecting channel 9, the waste solution channel 7, and the reaction bath section 3 are filled with the buffer solution.

Figure 4A:
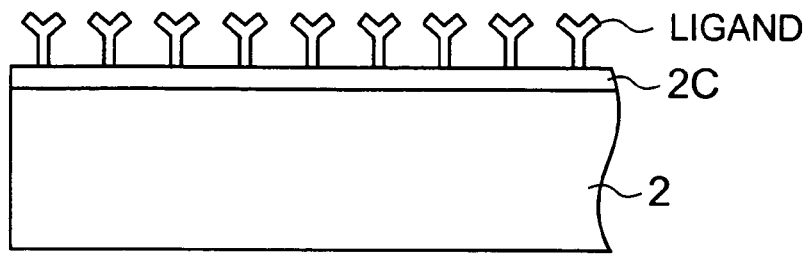
FIG. 4A-4C are an explanatory view schematically showing a binding reaction in a reaction bath section according to the analysis method shown in FIG. 3.
Figure 4B:
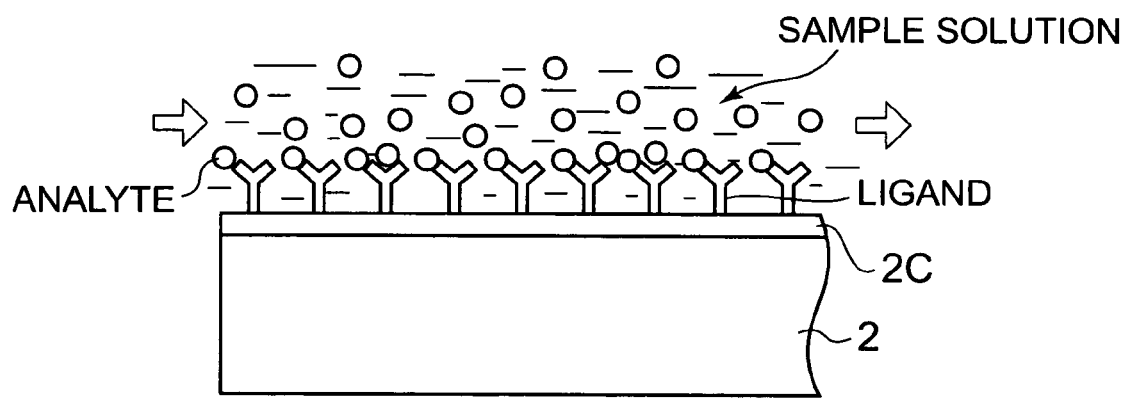
Figure 6:
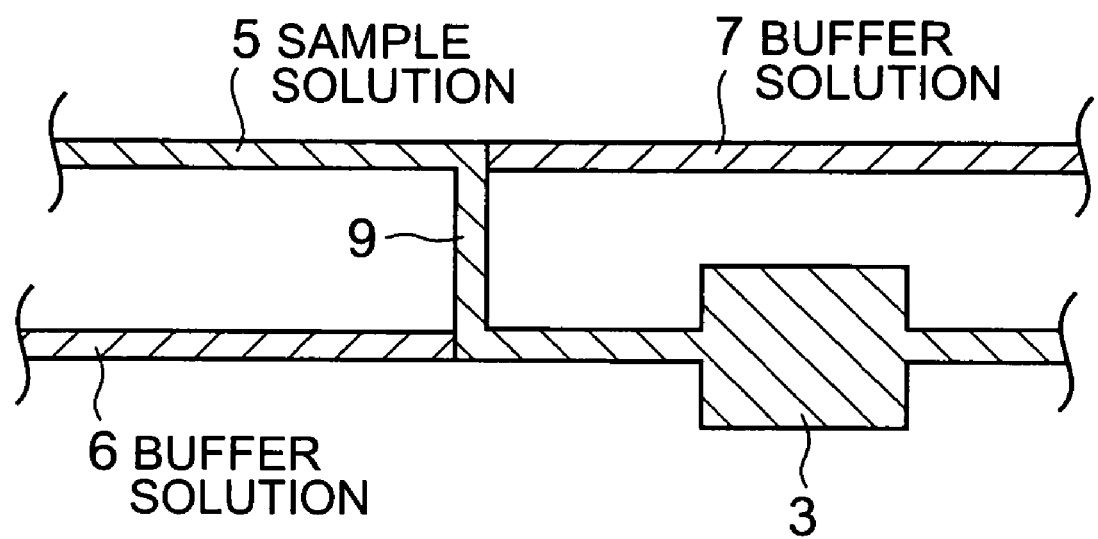
FIG. 6 is an explanatory view schematically showing the state of the fluid in each flow channel, which is subsequent to FIG. 5.
Figure 9:
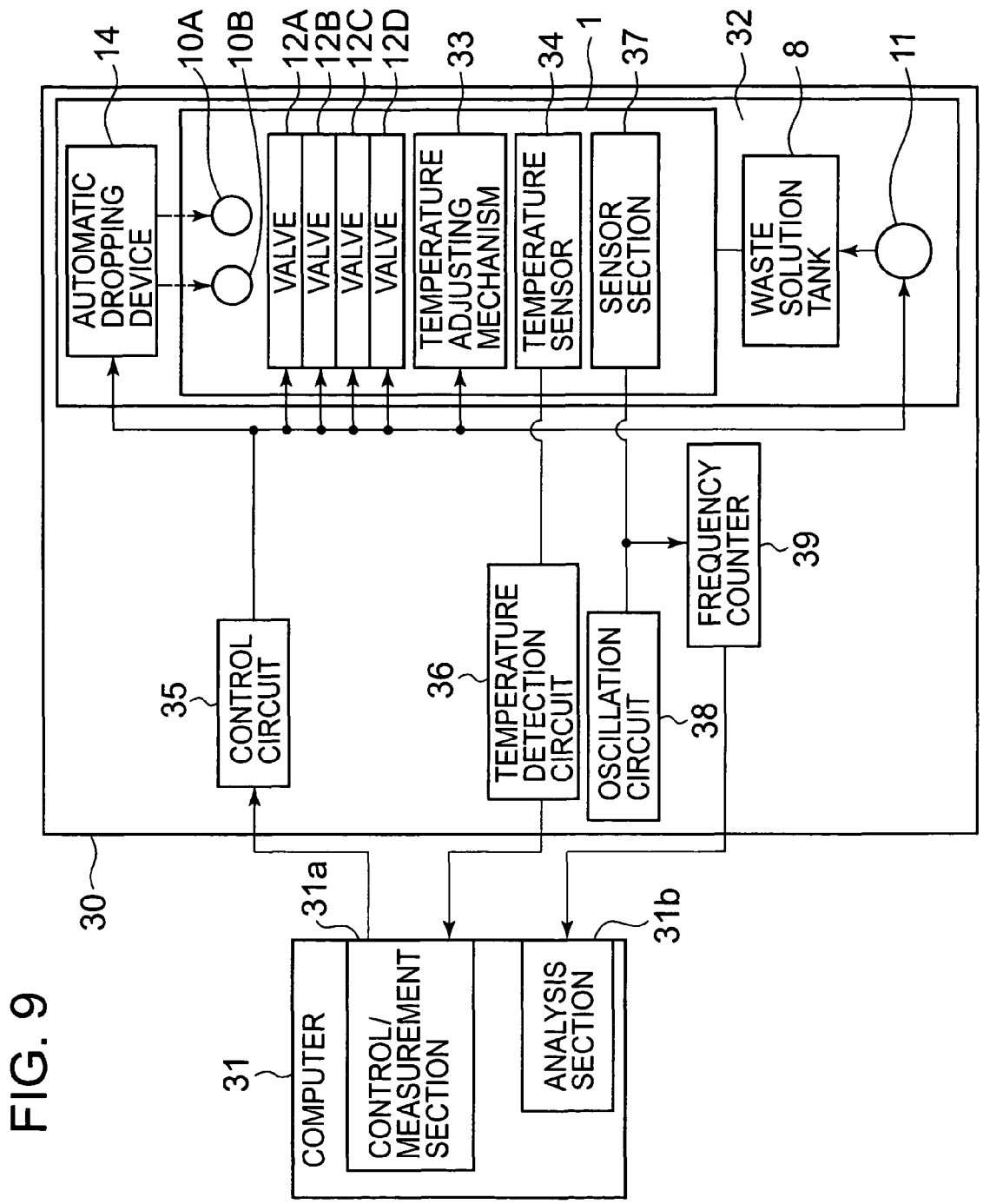
FIG. 9 is a block diagram of an analysis system having the microchip for analysis shown in FIG. 1.

In the step 24, the pump 11 is continuously operated with the valve 12B and the valve 12D kept open, in order not to stop the flow of the buffer solution from the buffer solution supply channel 6 via the reaction bath section 3 to the waste solution tank 8. At this point, in the temperature adjusting section 13 which is disposed between the valve 12D and the reaction bath section 3, a temperature adjusting mechanism 33 (see FIG. 9) such as a heater or the like is set to bring the buffer solution to a predetermined temperature, and at the same time, the suction force of the pump 11 is adjusted to allow the buffer solution to flow at a predetermined flow rate. After the adjustments of the temperature adjusting section 13 and the pump 11 (setting of operation conditions) are completed, the valve 12B is closed to stop the supply of the buffer solution, and at the same time, the valve 12A is opened to supply the sample solution via the sample solution supply channel 5 and the connecting channel 9 to the reaction bath section 3, as shown in FIG. 6. More specifically, the sample solution supplied from the sample solution supply channel 5 purges the buffer solution from the connecting channel 9 and the reaction bath section 3 and enters the reaction bath section 3. Then, the ligand modified in the reaction bath section 3 and the analyte contained in the sample solution undergo a binding reaction as shown in FIG. 4B, and the state of reaction is detected by measuring the phase of resonance signal at the moment by an optical means or the like (Step 25). Moreover, in the step 25, since the temperature adjusting section 13 and the pump 11 are properly adjusted, the sample solution is supplied to the reaction bath section 3 at a predetermined temperature and at a predetermined flow rate, so that the binding reaction is performed under predetermined conditions. If the valve 12A is closed and the suction operation of the pump 11 is stopped at a proper timing in consideration of the flow rate, a predetermined quantity of the sample solution is precisely supplied to the reaction bath section, thus completing the binding reaction. Moreover, as an example, the analysis conditions are such that the amount of the sample solution used in the reaction is 50 µl, the reaction time is, for example, from 5 to 50 minutes, and the flow rate of the sample solution through the operation of the pump 11 is from 1 to 10 µl/min.

Figure 4C:
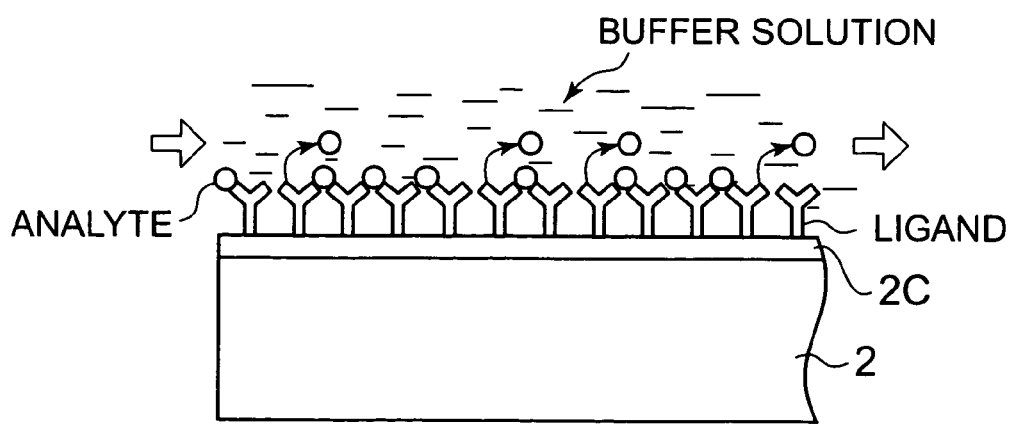
Figure 18:
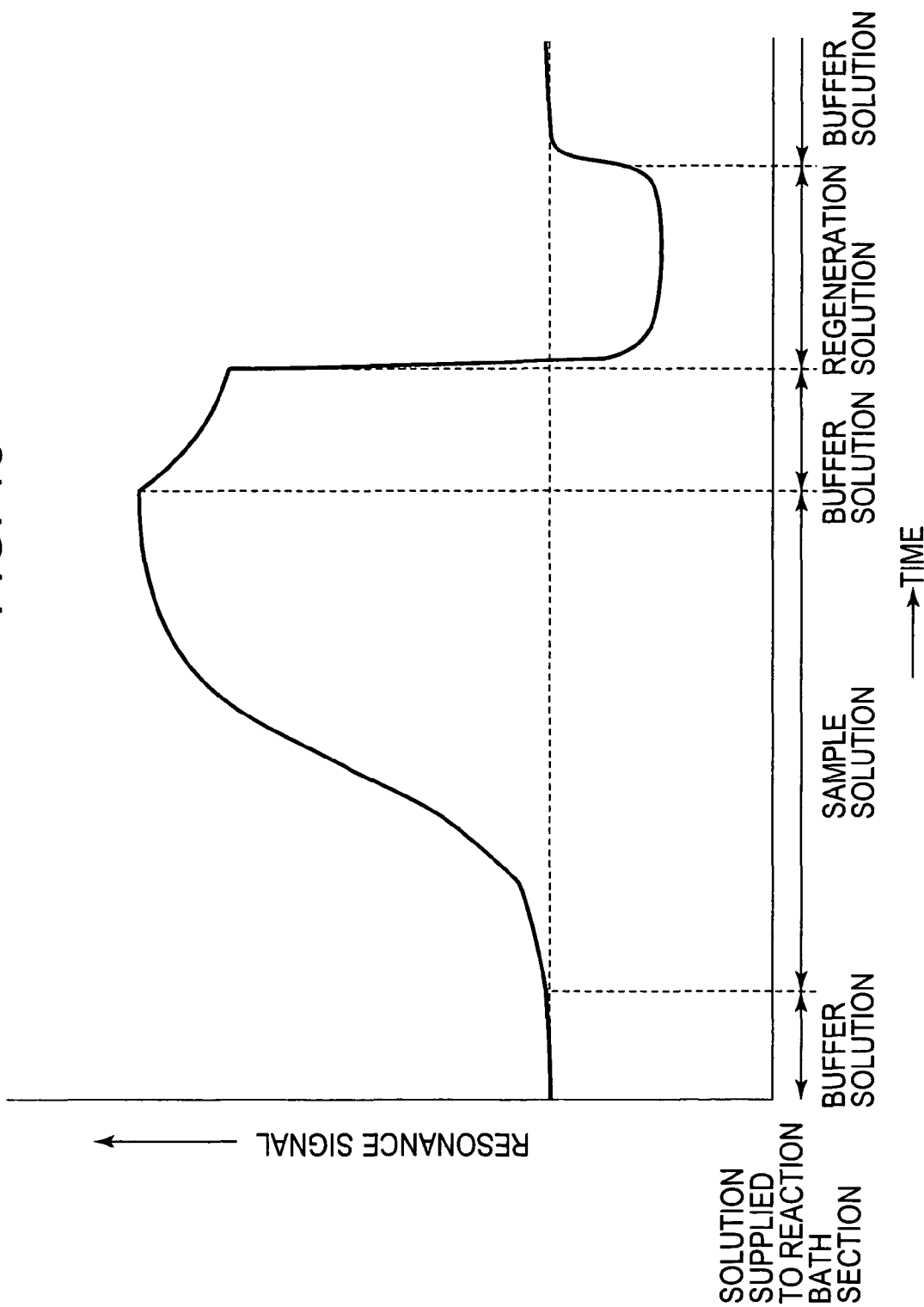
FIG. 18 is a graph showing a change in phase of a resonance signal as a detection result of the binding reaction between the ligand and the analyte.

Further, similarly to the related art shown in FIG. 18, when equilibrium in concentration is reached, the binding between the analyte and the ligand does not occur by so much, and the change in phase of the resonance signal is stopped. When the supply of the sample solution in a predetermined quantity is completed, and when the buffer solution is supplied again to the reaction bath section 3, as shown in FIG. 4C, a portion of the bound analyte-ligand undergoes dissociation, thus reducing the change in phase of the resonance signal. The detection of the dissociation state is effective in knowing, for example, the binding strength between the analyte and the ligand.

Figure 16:
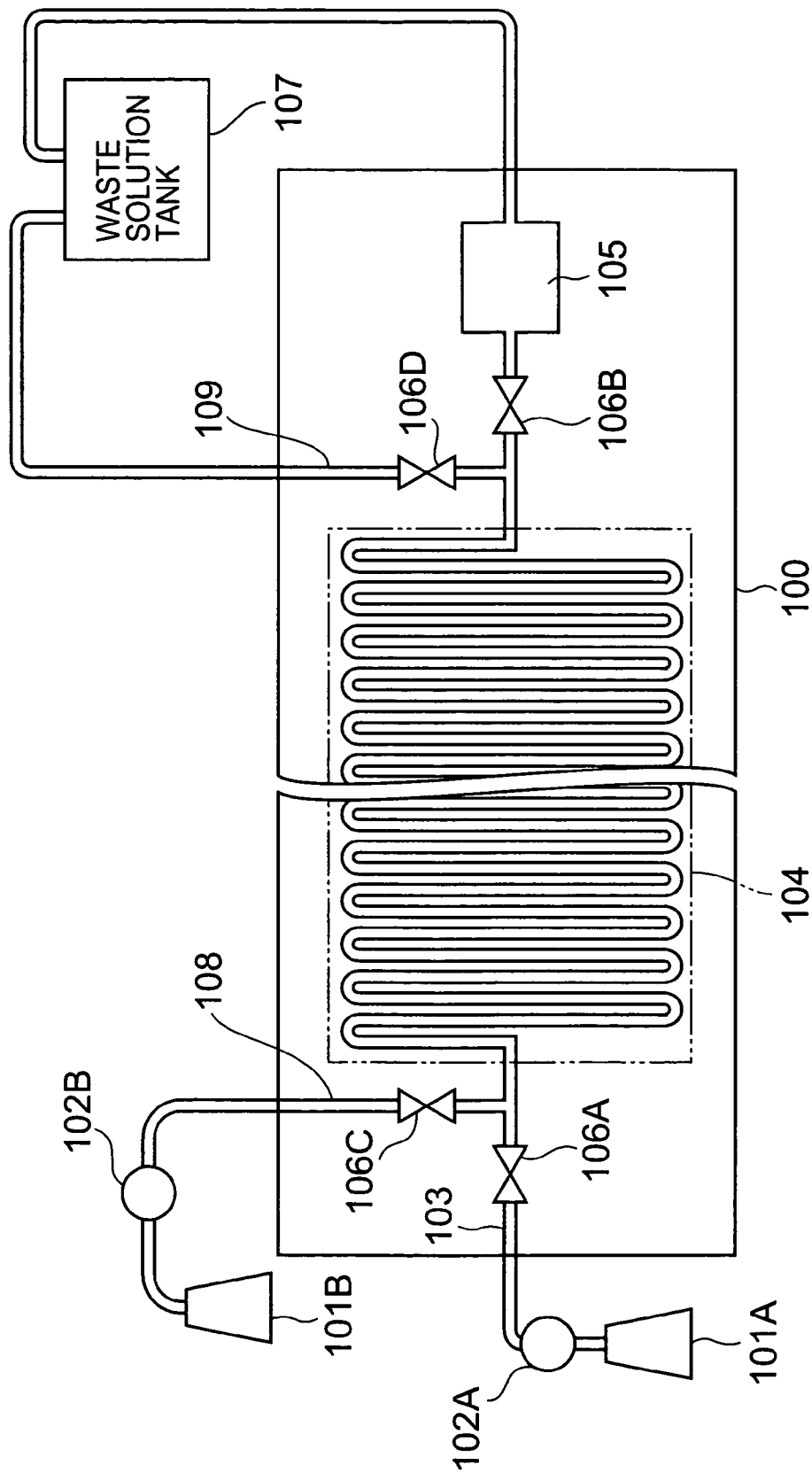
FIG. 16 is a schematic plan view of essential parts of an analysis apparatus according to a related art.
Figure 17:
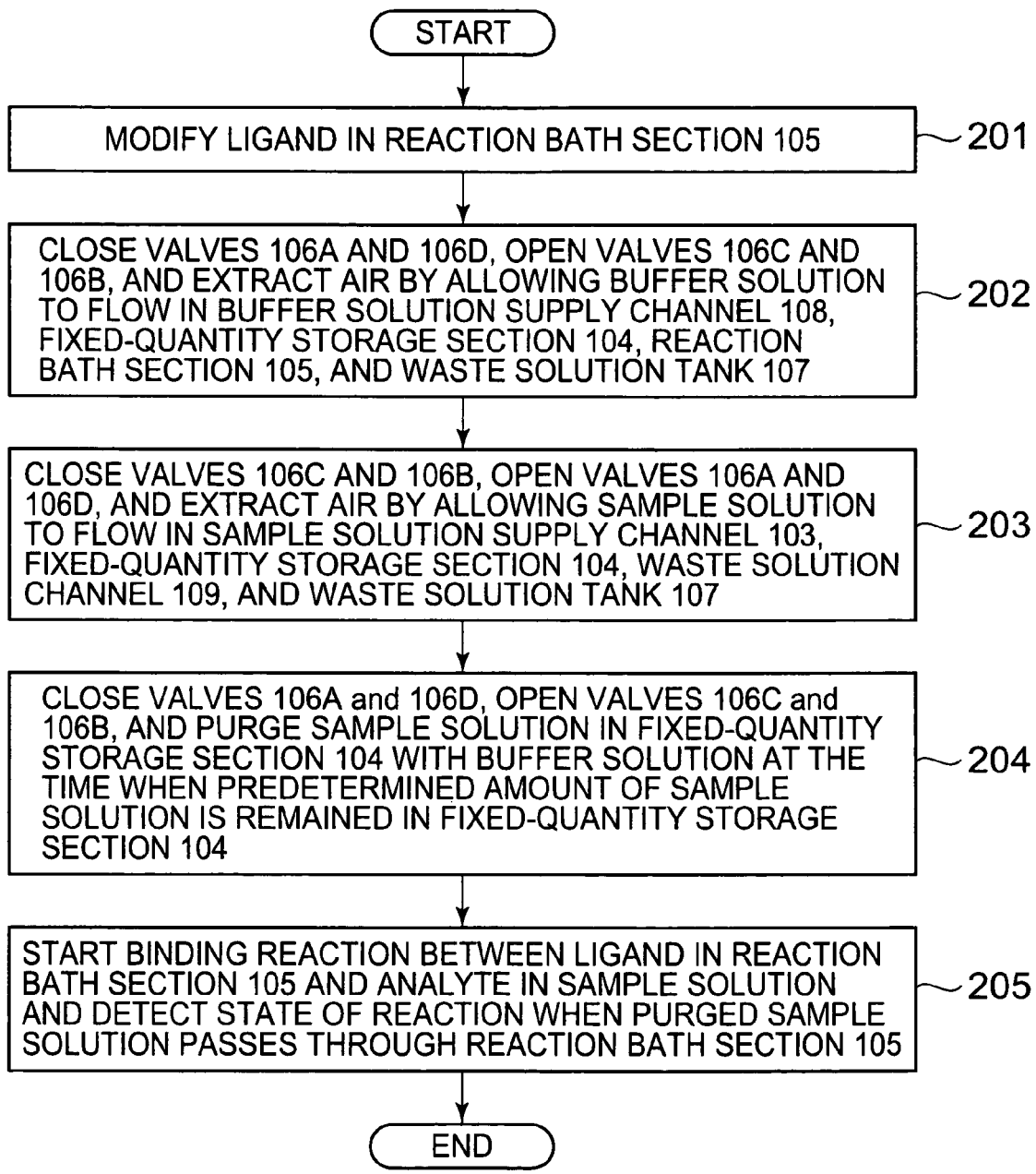
FIG. 17 is a flowchart of an analysis method using the analysis apparatus shown in FIG. 16.

As described above, according to the microchip for analysis 1 and the analysis method of the present embodiment, the configuration of each of the flow channels on the substrate 2 can be made very simple as well as compact. That is, when the predetermined amount of the sample solution is retained in the fixed-quantity storage section 104 and is purged by the buffer solution, as can be seen from the related art shown in FIG. 16, since the fixed-quantity storage section 104 is required to have a capacity sufficient to store the sample solution used in the reaction (for example, 50 µl), the entire substrate 100 becomes large, and it has been impossible to achieve a minute configuration to be called a microchip. For example, the substrate 100 of the related art shown in FIG. 16 is about 150 mm×50 mm in size. However, the substrate 2 of the present embodiment can be miniaturized to about 40 mm×15 mm and it can constitute the so-called microchip.

Further, the analysis apparatus of the related art shown in FIG. 16 has a configuration such that the sample solution in the sample solution vessel 101A is supplied by the pump 102A and the buffer solution in the buffer solution vessel 101B is supplied by the pump 102B, and thus two pumps 102A and 102B are needed. When these pumps 102A and 102B are provided outside the substrate 100, the operation of sealing and connecting the sample solution supply channel 103 and the buffer solution supply channel 108 formed on the substrate 100 to the pumps 102A and 102B with no leakage is complicated. Therefore, when the substrate 100 is to be made disposable, it should be replaced frequently, and much effort will be necessary in the replacement operation. Meanwhile, it is also envisaged to employ a configuration of providing a small-sized pump in the substrate 100 or mounting the pump on the substrate 100. In this case, however, the manufacturing or mounting process of the pump is complicated, which results in an increase in the production cost. In particular, the use and discard of the substrate 100 having such a pump means the use and discard of an expensive pump, which results in a significant loss in terms of the production cost.

On the contrary, the microchip for analysis 1 of the present embodiment has a configuration of having a single pump 11 which performs the suction operation when being connected to the waste solution tank 8, and thus it is not necessary to connect a pump to the sample solution supply channel 5 and the buffer solution supply channel 6. It is sufficient to provide the simple cup-shaped sample solution introducing port 10A and the buffer solution introducing port 10B, and the buffer solution and the sample solution can be simply dropped and supplied. Accordingly, an automatic dropping device 14, referred to as a so-called dispenser system, which automatically drops different liquids from a plurality of pipette-shaped dropping sections can be used.

According to the present embodiment, it is convenient to use only one pump 11, and the connection operation thereof is easy as well, without needing precision. This will be described below. Since the configuration of the related art has the pump 102A for transferring the sample solution to be analyzed, when the pump 102A is repeatedly used, there is a risk such that remnants of the sample solution used in the previous analysis still remain in the pump 102A and are mixed with a different sample solution during the subsequent analysis, which makes it impossible to perform an accurate analysis. Even though the pump 102A is washed with the buffer solution or a cleaning solution, there still remains the possibility of the small amount of the sample solution remaining behind. On the contrary, since the present embodiment has a configuration in which the suction-type pump 11 is connected to the waste solution tank 8 which is disposed downstream of the reaction bath section 3 where the reaction is performed, the sample solution to be analyzed that is supplied from the sample solution introducing port 10A and the sample solution supply channel 5 to the reaction bath section 3 does not pass through the pump 11, and thus there is no problem of contamination in the pump 11. Therefore, it is not necessary to distinguish the pump for the sample solution and the pump for the buffer solution, and the pump 11 can be repeatedly used without any obstacles. Further, in the related art, the connecting section between the pump 102A and the sample solution supply channel 103 forms a part of the flow channel in which the sample solution to be analyzed flows, and thus a high-level sealing or cleanness is needed in the connecting section. However, in the present embodiment, such a high-level sealing or cleanness is not required in the section connecting the pump 11, the waste solution tank 8, and the waste solution channel 7. However, it is possible, if necessary, to add another pump (not shown in the drawing) between the reaction bath section 3 and the waste solution tank 8 to maintain the conditions for supplying the sample solution with high precision.

As described above, according to the present embodiment, since the entire microchip for analysis 1 having the substrate 2 can be miniaturized, the configuration is simple and the cost is reduced. Then, the operation of mounting and removal at the time of replacement and the connection operation are easy. Thus, disposability of the microchip for analysis 1 is facilitated in practice.

Next, an advantage of preventing the sample solution to be analyzed from flowing into the reaction bath section 3 according to the flow channel configuration in the present embodiment will be described. FIG. 7 shows, as a comparative example with respect to the present embodiment, a configuration in which the supply channel for the sample solution and the supply channel for the buffer solution are altered from the configuration of the present embodiment. That is, in the comparative example shown in FIG. 7, one flow channel is formed as connected to the sample solution supply channel 5 and the reaction bath section 3, and the other flow channel is formed as connected to the buffer solution supply channel 6 and the waste solution channel 7, with a connecting channel 9 being disposed between the two flow channels.

In an analysis apparatus, it is essential to perform the extraction of air from each of the flow channels before the analysis, while the ligand is preliminarily modified in the reaction bath section 3. Since both the present embodiment and the comparative example have simple configurations without additional devices for extracting air (for example, a device for making the flow channels vacuous or a device for flowing a special liquid for extracting air), the extraction of air is performed by purging air with the buffer solution or the sample solution flowing in the flow channels.

Figure 7A:
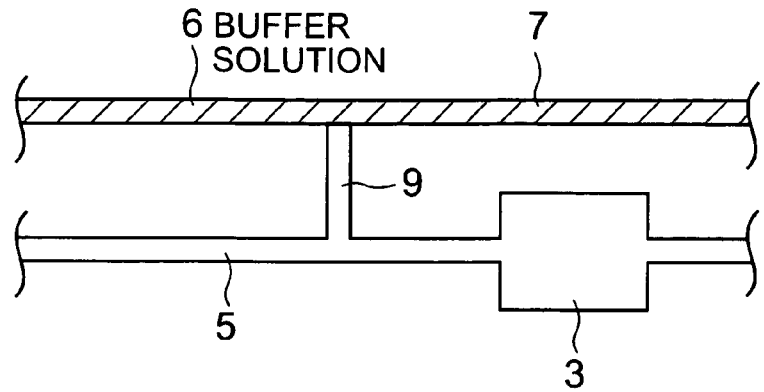
FIGS. 7A-7C are an explanatory view schematically showing the state of the fluid in each flow channel according to an analysis method in a comparative example.
Figure 7B:
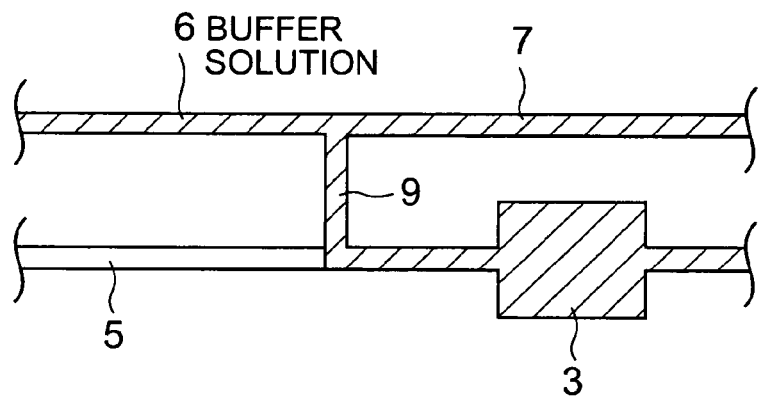
Figure 7C:
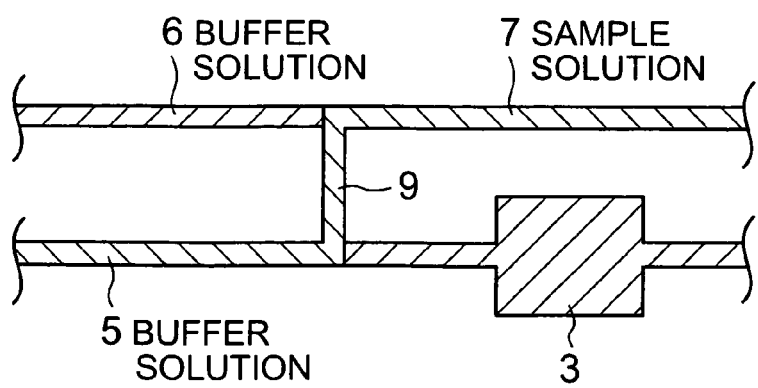

In the configuration of the comparative example, a step of discharging the buffer solution from the buffer solution supply channel 6 through the waste solution channel 7 to the waste solution tank 8 (Step 31), as shown in FIG. 7A, and a step of discharging the buffer solution from the buffer solution supply channel 6 through the connecting channel 9 and the reaction bath section 3 to the waste solution tank 8 (Step 32), as shown in FIG. 7B, are performed so as to extract air from at least the buffer solution supply channel 6, the waste solution channel 7, and the reaction bath section 3. Further, before analysis, the sample solution is caused to flow through the sample solution supply channel 5 so as to extract air in the sample solution supply channel 5. However, if this sample solution is caused to flow through the reaction bath section 3, a binding reaction between the ligand and the analyte takes place-at this point, which makes it impossible to perform accurate analysis afterwards. Therefore, the sample solution supplied before analysis to extract air from the sample solution supply channel 5 must reach the waste solution channel 7 via the connecting channel 9 and subsequently flow to the waste solution tank 8, as shown in FIG. 7C (Step 33). In the case in which the sample solution flows as such, the connecting channel 9 is filled with the sample solution. Further, there is a need to perform the adjustment of the fluid temperature and the flow rate to regulate the state of the reaction bath section 3 as far as possible by allowing the buffer solution to flow through the reaction bath section 3 just before analysis. However, if the buffer solution flows through the reaction bath section 3, as shown in FIG. 7C, the buffer solution forces the sample solution in the connecting channel 9 into the reaction bath section 3, and the binding reaction between the ligand and the analyte begins before analysis. Thus, it is impossible to flow the buffer solution through the reaction bath section 3 just before analysis.

This will be described below in more detail. In the comparative example, the step 32 in which the buffer solution is caused to flow from the buffer solution supply channel 6 to the connecting channel 9 and the reaction bath section 3, as shown in FIG. 7B, should be inevitably performed before the step 33 in which the sample solution is caused to flow from the sample solution supply channel 5 to the connecting channel 9 and the waste solution channel 7, as shown in FIG. 7C. This is because when this order of steps is reversed, the step 32 is performed when the sample solution has already filled the connecting channel 9, and thus the sample solution filling the connecting channel 9 is forced into the reaction bath section 3 by the buffer solution, subsequently the binding reaction between the ligand and the analyte beginning at the time of extracting air before analysis. Thus, as described above, after the buffer solution supply channel 6, the connecting channel 9, and the reaction bath section 3 are filled with the buffer solution, as shown in FIG. 7B, in the step 32, the sample solution is supplied from the sample solution supply channel 5 to the connecting channel 9 and the waste solution channel 7 in the step 33. During the step 33, there is no flow in the reaction bath section 3, and the buffer solution stays therein. Thereafter, it is contemplated that, when the sample solution is supplied from the sample solution supply channel 5 to the reaction bath section 3, the binding reaction of the ligand with the analyte occurs, such that the analysis is performed. In this case, however, there is a risk that the state of the sample solution supplied to initiate the binding reaction may be unstable.

In order to bring into the desired chemical reaction in the reaction bath section 3, it is necessary to set the temperature of the sample solution flowing through the reaction bath section 3 or the flow rate appropriately. The temperature of the sample solution is adjusted by the temperature adjusting section 13, and the flow rate is adjusted by the pump 11. However, in a case in which the microchip for analysis 1 is used and discarded, like the present embodiment, it is unavoidable that there may exist more or less a deviation in each microchip for analysis 1, and the temperatures of the buffer solution and of the sample solution are susceptible to the influence of the environment temperature. Therefore, the operation conditions of the temperature adjusting section 13 and the pump 11 to obtain the desired temperature and flow rate should be determined by trial and error, while actually flowing the buffer solution, instead of the sample solution, through the reaction bath section 2 prior to analysis. In view of operation efficiency and the like, the settings of the temperature adjusting section 13 and the pump 11 are performed during the step of extracting air, while the buffer solution flows through the reaction bath section 3. Therefore, in the case of the above-described comparative example, the timing for setting the temperature adjusting section 13 and the pump 11 constitutes the step 32, as shown in FIG. 7B. However, as described above, since the step 33 must be performed after the step 32, there is no flow in the reaction bath section 3 during the step 33. That is, after the temperature adjusting section 13 and the pump 11 are set appropriately in the step 32, the flow in the reaction bath section 3 in the step 33 is stopped for the moment, and the flow in the reaction bath section 3 is restarted when actual analysis is performed. As such, by stopping the flow in the reaction bath section 3 temporarily, there is possibility that the desired temperature and flow rate cannot be necessarily achieved during actual analysis in spite of the effort to set the temperature adjusting section 13 and the pump 11 appropriately in the step 32.

Considering the cause thereof, stabilizing the temperature of the fluid and the flow rate means achieving a thermal equilibrium with respect to the fluid flow (flow rate) and the amount of heating (temperature) at the time of adjustment. That is, the fluid temperature can be made constant by granting heat sufficient to counterbalance heat carried by the flowing fluid and controlling the temperature adjusting section 13 such as heater to avoid extremes in heat. However, when the flow in the reaction bath section 3 is stopped temporarily, the state of thermal equilibrium achieved with so much effort will be destroyed. For example, while the flow is stopped, when heating is continued under the conditions set for the continuous flow by the temperature adjusting section 13, the temperature of the fluid and of the surroundings is elevated excessively. When heating is stopped, the temperature of the fluid and of the surroundings is declined to return to the original value. In either case, there is high possibility that the desired chemical reaction would not take place at the starting time of analysis. This is because the certain time will be taken until the thermal equilibrium in the temperature and flow rate is achieved again, that is, until the predetermined flow rate and temperature is achieved, after restarting of fluid flow at the time of beginning of actual analysis.

Further, when the flow in the reaction bath section 3 is stopped temporarily after adjusting the flow rate, there is high possibility that resistance in the flow channels would fluctuate greatly. When a valve is closed to stop the flow, the reaction bath section 3 and the surrounding would become a closed space, and thus the pressure becomes more vacuous than the pressure in the reaction bath section 3 before closing the valve. Under this circumstance, when the valve is opened again, at the moment the fluid flows with great power (at large flow rate), and the flow rate gradually decreases to be stabilized to the predetermined flow rate as set in the step 32. During the time taken for the flow rate to decrease and be stabilized as such, there is possibility that the desired stable chemical reaction may not occur. Further, although there is possibility that some air may break into the flow channels when a fluid flow is generated by the action of the pump 11, it is believed that the rate of air intrusion also fluctuates according to the pressure in the flow channels. It is thought that such fluctuation in the rate of air intrusion serves as, in particular, the cause for making the flow rate of fluid (solution) just after the open and close operations of the valves more unstable. A problem as such is particularly conspicuous when the fluid is caused to flow by means of the suction of the pump 11, like the present embodiment.

As described above, it is contemplated that the disorder in the temperature and flow rate due to the temporary stop of the fluid flow in the reaction bath section 3 would be mostly settled as long as the fluid flow in the reaction bath section 3 is not stopped, since the thermal equilibrium and the pressure would be maintained as they are under the conditions appropriately set for the temperature adjusting section 13 and the pump 11. In consideration of this point, it can be viewed that the present embodiment shown in FIGS. 4 and 5 is highly advantageous over the comparative example shown in FIG. 7.

In the present embodiment, as described above, the buffer solution supply channel 6 and the reaction bath section 3 are connected to form the first flow channel, the sample solution supply channel 5 and the waste solution channel 7 are connected to form the second flow channel, and the connecting channel 9 is disposed between these two flow channels. Therefore, when the temperature adjusting section 13 and the pump 11 are subjected to appropriate setting, while extracting air by supplying the buffer solution from the buffer solution supply channel 6 to the reaction bath section 3 in the step 24, the fluid flowing through the reaction bath section 3 can be shifted from the buffer solution to the sample solution, only by switching over the valves 12A and 12B. Here, since the flow in the reaction bath section 3 is constant despite the shift of fluid, the thermal equilibrium or the pressure condition are maintained as it is under the conditions set for the temperature adjusting section 13 and the pump 11 in the step 24. Therefore, from the time of the reaction starting after the entrance of the sample solution into the reaction bath section 3, the flow rate and the temperature of the sample solution are stabilized, and the desired chemical reaction can be performed. Further, like FIG. 18, the analysis can be performed by bringing into a good binding reaction by allowing the buffer solution, the predetermined amount of the sample solution, and the buffer solution to sequentially flow in the reaction bath section 3. Of course, there is no chance for the sample solution to flow into the reaction bath section 3 before analysis. Like the present embodiment, such a process becomes possible only with the configuration that the buffer solution supply channel 6 and the reaction bath section 3 are connected to form the first flow channel, the sample solution supply channel 5 and the waste solution channel 7 are connected to form the second flow channel, and the connecting channel 9 is disposed between these two flow channels.

Figure 3:
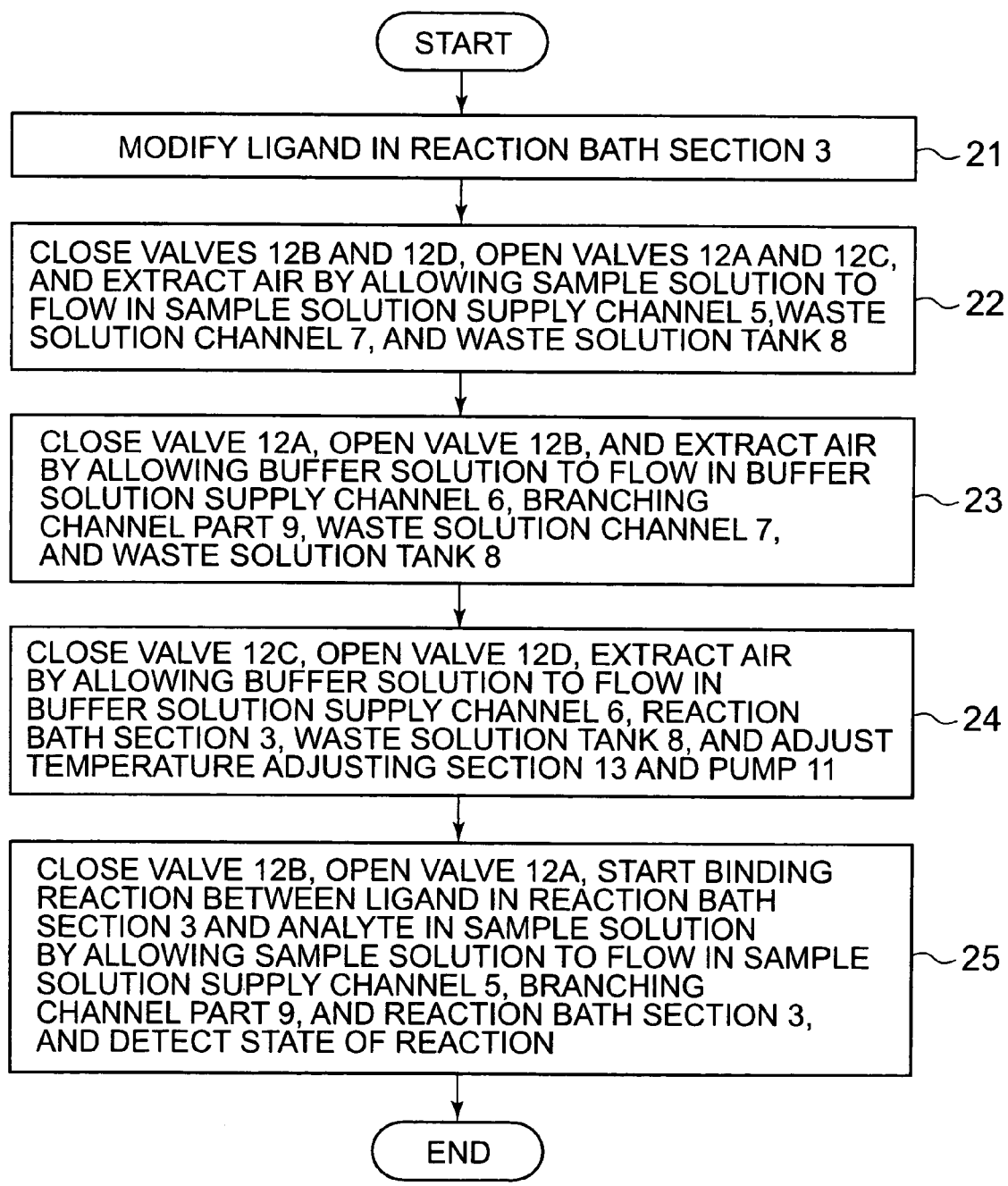
FIG. 3 is a flowchart of an analysis method using the analysis apparatus shown in FIG. 1.

In the above-described embodiment, the analysis is performed by sequentially executing the steps 21 to 25 shown in FIGS. 3, 5, and 6, but the same effect as described above can be also obtained by executing the steps 22 to 24 for extracting air in different orders. Some of the specific examples will be described below.

In a first modification, after the step 21, the buffer solution is led by the suction to the waste solution tank 8 via the buffer solution supply channel 6, the connecting channel 9, and the waste solution channel 7 to extract air from the buffer solution supply channel 6, the connecting channel 9, and the waste solution channel 7 (Step 23). Subsequently, the sample solution is led by the suction to the waste solution tank 8 via the sample solution supply channel 5 and the waste solution channel 7 to extract air from the sample solution supply channel 5 and waste solution channel 7 (Step 22). Then, the settings of the temperature adjusting section 13 and the pump 11 are performed, while the buffer solution is led by the suction to the waste solution tank 8 from the buffer solution supply channel 6 via the reaction bath section 3 to extract air from the reaction bath section 3 and the flow channels connected thereto at the same time (Step 24). Next, the step 25 is performed. According to this method, substantially the same effect as described above can be obtained.

In a second modification, after the step 21, the step 23 is performed to allow the buffer solution to flow through the buffer solution supply channel 6, the connecting channel 9, and the waste solution channel 7. Subsequently, the step 24 is performed to allow the buffer solution to flow through the buffer solution supply channel 6 and the reaction bath section 3 (however, in this case, the settings of the temperature adjusting section 13 and the pump 11 are not needed). Then, the step 22 is performed to allow the sample solution to flow through the sample solution supply channel 5 and the waste solution channel 7. Further, the step 26 is additionally performed, in which the settings of the temperature adjusting section 13 and the pump 11 are performed, while the buffer solution is caused to flow again through the buffer solution supply channel 6 and the reaction bath section 3. Next, the step 25 is performed. In this method, since the steps 24 and 26 in which the buffer solution is caused to flow through the buffer solution supply channel 6 and the reaction bath section 3 overlap, it is not efficient. However, in the step 26, while the buffer solution is caused to flow through the reaction bath section 3, with the temperature adjusting section 13 and the pump 11 being appropriately adjusted, the supply of the buffer solution can be shifted to the supply of the sample solution, without stopping the flow in the reaction bath section 3, to achieve the desired chemical reaction stably. Of course, at the time of extracting air before analysis, there is no such an incidence that the sample solution flows to the reaction bath section 3.

In a third modification which is similar to the method of the second modification, after the step 21, the step 22 is performed to allow the sample solution to flow through the sample solution supply channel 5 and the waste solution channel 7. Subsequently, the step 24 is performed to allow the buffer solution to flow through the buffer solution supply channel 6 and the reaction bath section 3 (however, in this case, the settings of the temperature adjusting section 13 and the pump 11 are not needed). Then, the step 23 is performed to allow the buffer solution to flow through the buffer solution supply channel 6, the connecting channel 9, and the waste solution channel 7. Then, the step 26 is performed to execute the settings of the temperature adjusting section 13 and the pump 11, while allowing the buffer solution to flow again through the buffer solution supply channel 6 and the reaction bath section 3. Next, the step 25 is performed. In this method, substantially the same effect as in the second modification can be obtained.

In a fourth modification, too, which is similar to the second or third modification, after the step 21, the step 24 is performed to allow the buffer solution to flow through the buffer solution supply channel 6 and the reaction bath section 3 (however, in this case, the settings of the temperature adjusting section 13 and the pump 11 are not needed). Subsequently, the step 22 is performed to allow the sample solution to flow through the sample solution supply channel 5 and the waste solution channel 7. Then, the step 23 is performed to allow the buffer solution to flow through the buffer solution supply channel 6, the connecting channel 9, and the waste solution channel 7. Then, the step 26 is performed to execute the settings of the temperature adjusting section 13 and the pump 11, while allowing the buffer solution to flow again through the buffer solution supply channel 6 and the reaction bath section 3. Next, the step 25 is performed. In this method, too, substantially the same effect as that of the second or third modification can be obtained.

Again, in a fifth modification which is similar to the second to fourth modifications, after the step 21, the step 24 is performed to allow the buffer solution to flow in the buffer solution supply channel 6 and the reaction bath section 3 (however, in this case, the settings of the temperature adjusting section 13 and the pump 11 are not needed). Subsequently, the step 23 is performed to allow the buffer solution to flow through the buffer solution supply channel 6, the connecting channel 9, and the waste solution channel 7. Then, the step 22 is performed to allow the sample solution to flow through the sample solution supply channel 5 and the waste solution channel 7. Then, the step 26 is performed to execute the settings of the temperature adjusting section 13 and the pump 11, while allowing the buffer solution to flow again through the buffer solution supply channel 6 and the reaction bath section 3. Next, the step 25 is performed. In this method, too, substantially the same effect as in the second modification can be obtained.

During the actual analyses, any one of the method of the present embodiment as described above and the methods of the first to the fifth modifications can be arbitrarily selected and performed. Further, besides these methods, it is also possible to select a method in which the steps 22 to 24 of extracting air are performed in an arbitrary order. The settings of the temperature adjusting section 13 and the pump 11 are performed while allowing the buffer solution to flow through the reaction bath section 3. Further, by executing the step 24 or the step 26 immediately before actually bringing into the chemical reaction for analysis, and also as the sample solution is prevented from flowing in the reaction bath section 3 at the time of extracting air prior to analysis, the order of other steps can be arbitrarily altered.

Next, a detailed morphology of the reaction bath section 3 in the microchip for analysis 1 of the present embodiment will be described.

Figure 19:
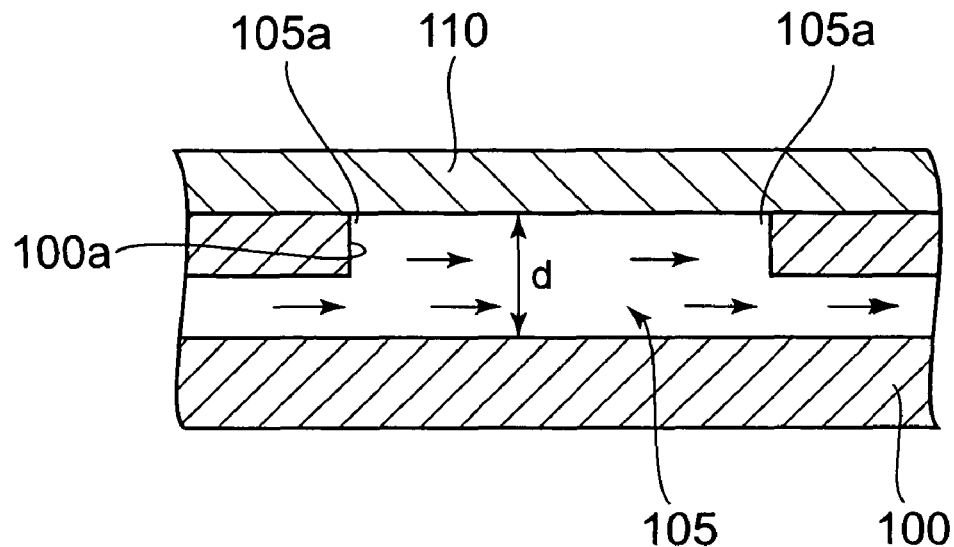
FIG. 19 is an expanded cross-sectional view showing an example of a detailed configuration of a reaction bath section of the analysis apparatus according to the related art.
Figure 20:
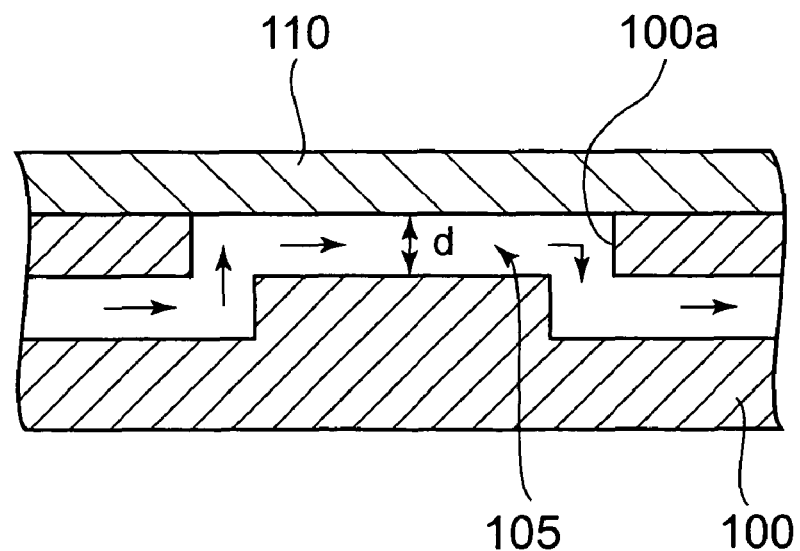
FIG. 20 is an expanded cross-sectional view showing another example of the detailed configuration of the reaction bath section of the analysis apparatus according to the related art.

As described above, the reaction bath section 105 of the analysis apparatus according to the related art has a configuration such that the substrate 100 has the window 100a and the window 100a is covered by the sensor chip 110 (see FIGS. 19 and 20), the ligand being modified in the sensor chip 110 which serves as the cover. That is, since the substrate 100 is repeatedly used in a number of analyses in the related art, it is very difficult to perform modification with the ligand used in the corresponding analysis onto the interior of the reaction bath section 105 on the substrate 100 which is fixed in the analysis apparatus whenever there is an analysis performed. Thus, the apparatus employs a configuration in which a part of the reaction bath section 105 is formed from a separable sensor chip 110 and the sensor chip 110 is modified with the ligand. In this configuration, the flow cell structure shown in FIG. 20 is generally used, in which a vertical spacing d in the reaction bath section 105 is narrowed-to the desired spacing so as to obtain a uniform flow without stagnation. However, the morphology becomes complicated, and thus the processing of the substrate 100 is very elaborate. Therefore, the production cost is increased and the demerits with respect to the use and discard of the substrate 100 are increased further.

Figure 8A:
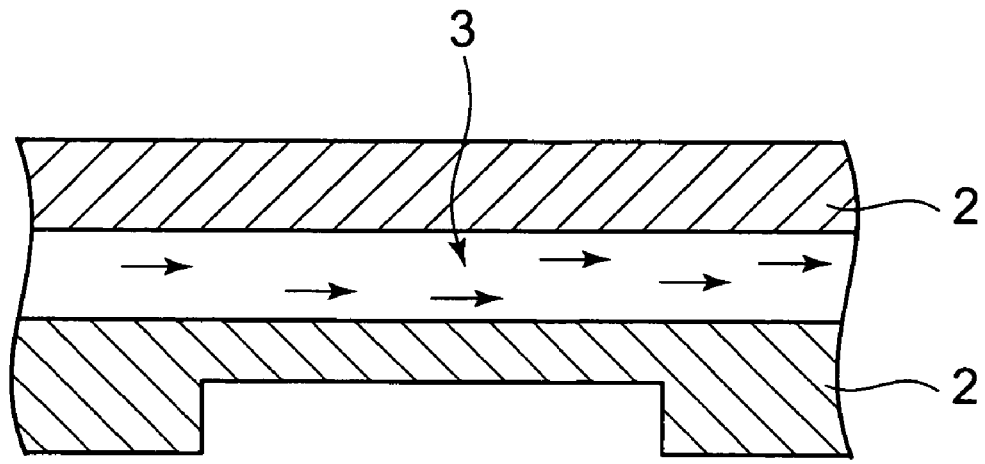
FIGS. 8A-8B are an expanded cross-sectional view of an example of a detailed configuration of the reaction bath section of the microchip for analysis shown in FIG. 1.
Figure 8B:
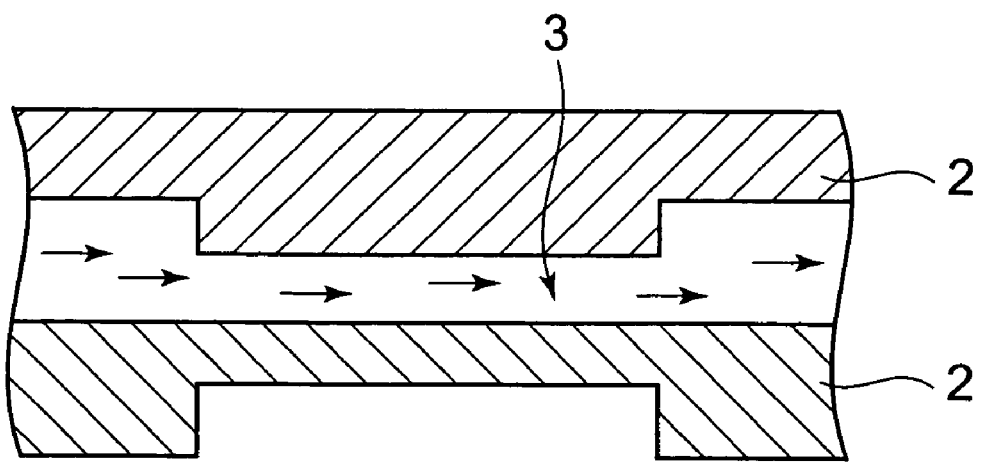

On the contrary, in this embodiment, since the microchip for analysis of the invention is of a disposable type, it is preferable to prepare a chip for analysis with the ligand preliminarily modified therein used in the analysis and to replace the microchip for analysis for each analysis. Therefore, there is no need to have a structure using the sensor chip used in the related art shown in FIG. 20, and thus there is no need to have the so-called flow cell structure. As a result, as shown in FIG. 8A, the morphology can be simple, with only parallel planes facing each other, and as shown in FIG. 8B, the spacing can be narrowed by forming a protrusion on the substrate 2. The structure shown in FIG. 8A or 8(b) facilitates the manufacturing process or positioning and assembling, as compared to the flow cell structure.

In the present embodiment, it is not necessary to perform the detection with the optical means. For example, an electrical detection method can be employed, which involves a configuration of providing a sensor made of quartz in the reaction bath-section 3 and detecting the transmission frequency or a configuration of providing a sensor made of a piezoelectric material (possibly quartz) in the reaction bath section 3 and inducing an elastic wave on the surface to detect changes therefrom. Accordingly, as shown in FIG. 8B, a configuration in which a protrusion is provided on the substrate 2 can be adopted. In this case, it is not necessary to provide an external optical means, and the sensor device can be completely built in the microchip for analysis 1, thus easily implementing the compact analysis apparatus as a whole. Further, since the positioning of external members such as the optical means with the reaction bath section 3 becomes unnecessary, the assembling process is facilitated, and it is particularly suitable for disposability of the microchip for analysis 1 under frequent replacement.

Further, the valves 12A to 12D of the present embodiment are not typical normal open valves, that is, valves which are opened initially and closed during operation, but are preferably normal close valves, that is, valves which are closed initially and opened during operation. In this case, an accident such as an erroneous flow of the sample solution in the reaction bath section 3 before analysis can be prevented. Each of the valves 12A to 12D may have a structure in which the flow channel is blocked by pressing a bar-shaped member to result in causing deformation of the substrate.

In addition, the present embodiment involves the cup-shaped sample solution introducing port 10A and the buffer solution introducing port 10B, but the invention is not limited to this configuration. In particular, though not shown, the buffer solution introducing port 10B may have the configuration of sucking up the buffer solution from the buffer solution bath (buffer solution tank) through a tube to the buffer solution supply channel 6, like the related art. This is because there is no fear of contamination, since there are many cases in which the same buffer solution is continuously used in a variety of analyses, unlike the sample solution.

An example of the analysis system having the microchip for analysis 1 of the invention as described above is shown schematically in FIG. 9. The analysis system mainly has an analysis apparatus 30 of the size of a table and a computer 31 connected to the analysis apparatus 30.

The above-described microchip for analysis 1 mounted on the mounting section 32 of the analysis apparatus 30 is set such that the solution transfer section (for example, automatic dropping device 14) for the sample solution and the buffer solution faces the sample solution introducing port 10A and the buffer solution introducing port 10B. In addition, the reaction bath section 3 and the waste solution channel 7 are connected to the waste solution tank 8 to which the pump 11 is connected. Further, the temperature adjusting section 13 has the temperature adjusting mechanism 33 (for example, heating element, Peltier element, or the like) and a temperature sensor 34 disposed therein. In addition, the automatic dropping device 14, a plurality of valves 12A to 12D, each operating individually, the temperature adjusting mechanism 33, and the pump 11 are connected to a control circuit 35. The temperature sensor 34 is connected to a temperature detection circuit 36. The sensor section 37 provided in the reaction bath section 3, for example, a QCM (Quartz Crystal Microbalance) sensor is connected to a transmission circuit 38 and a frequency counter 39. Further, the control circuit 35 and the temperature detection circuit 36 are connected to the control/measurement section 31a of the computer 31, and the frequency counter 39 is connected to the analysis section 31b in the computer 31. Thus, the above-described process for analysis (see FIG. 3) can be performed by means of such an analysis system.

With regard to the method for detection and analysis of reaction in the reaction bath section 3, any known method can be employed and thus it will not be described in detail herein. In an example, the analysis section 31b calculates a change in weight in the reaction bath section 3 based on the reaction detected by the sensor section 37 after the above-described steps 21 to 25, from the fluctuation in electric signal from the frequency counter 39 connected to the sensor section 37 and the transmission circuit 38. At the same time, dissociation constant is calculated from the change in weight with time and the protein concentration.

Further, in the above-described embodiment, although the case in which the ligand is preliminarily modified is described, there still exist those cases necessitating introduction of a reagent for ligand modification or introduction of a special reagent for cleaning. Accordingly, separate paths or inlets for introducing the reagents are optionally required. An embodiment in which the ligand and various reagents are supplied to the reaction bath using the flow channels in the microchip for analysis in such a manner will be described later.

Second Embodiment

Next, a microchip for analysis 40 of a second embodiment of the invention shown in FIG. 10 will be described. The same elements as those of the microchip for analysis 1 of the first embodiment shown in FIGS. 1 and 2 are represented by the same reference numerals and thus the descriptions thereof will be omitted.

Figure 10:
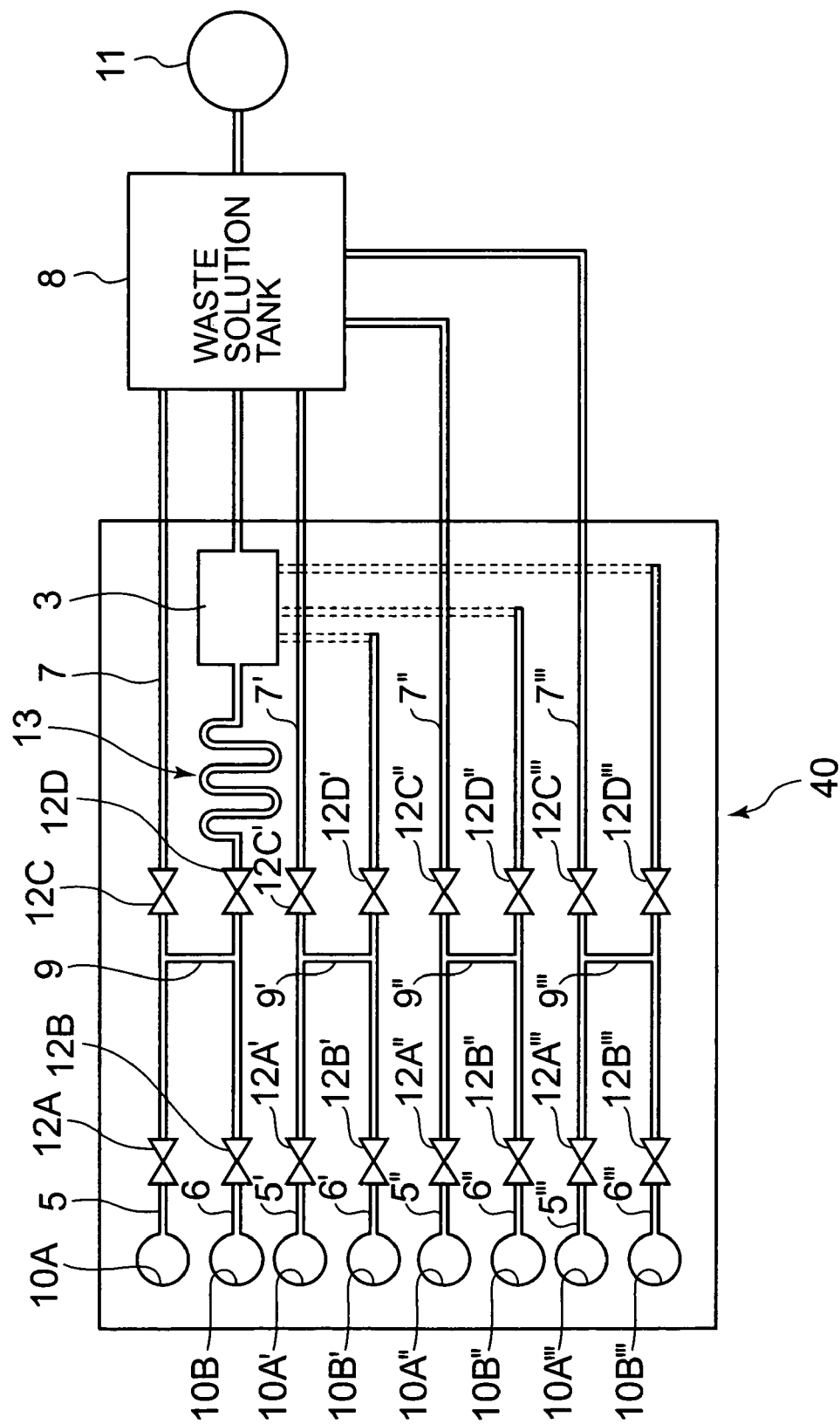
FIG. 10 is a schematic plan view of a microchip for analysis and elements thereof in an analysis apparatus according to a second embodiment of the invention.

The microchip for analysis 40 shown in FIG. 10 has a configuration which is substantially identical to the four-flow channel-configuration of the microchip for analysis 1 shown in FIGS. 1 and 2. That is, in addition to the configuration of the microchip for analysis 1 shown in FIGS. 1 and 2, a buffer solution supply channel 6' (another buffer solution supply channel) and the reaction bath section 3 are connected to form a third flow channel, the ligand solution supply channel (treatment solution supply channel) 5' and the waste solution channel 7' are connected to form a fourth flow channel. Further, a connecting channel (connecting channel for treatment solution) 9' which is connected to an upstream side of the reaction bath section 3 of the third flow channel from the fourth flow channel is provided. In the fourth flow channel, valves 12A' and 12C' are disposed upstream of the connecting channel 9 and downstream of the connecting channel 9', respectively. In the third flow channel, a valve 12B' and a valve 12D' are disposed upstream to the area connected to the connecting channel 9' and downstream to the area connected to the connecting channel 9, respectively. A ligand solution (treatment solution) is supplied to a port 10A' which is provided on the ligand solution supply channel 5', and the buffer solution is supplied to a port 10B' which is provided on the buffer solution supply channel 6'.

Further, the buffer solution supply channel 6" and the reaction bath section 3 are connected to form a fifth flow channel, and a SAM (Self-Assembled Monolayer) reagent supply channel (supply channel for another treatment solution) 5" and the waste solution channel 7" are connected to form a sixth flow channel. Further, a connecting channel 9" which is connected to an upstream side of the reaction bath section 3 of the fifth flow channel from the sixth flow channel is provided. On the sixth flow channel, a valve 12A" and a valve 12C" are provided upstream of the connecting channel 9" and downstream of the connecting channel 9", respectively. On the fifth flow channel, a valve 12B" and a valve 12D" are provided upstream of a portion which is connected to the connecting channel 9" and downstream of the portion connected to the connecting channel 9''', respectively. An SAM reagent (another treatment solution) is supplied to a port 10A" which is provided on the SAM reagent supply channel 5" and the buffer solution is supplied to a port 10B" which is provided on the buffer solution supply channel 6".

Further, the buffer solution supply channel 6''' and the reaction bath section 3 are connected to form a seventh flow channel, and a blocking reagent supply channel (another treatment solution supply channel) 5''' and a waste solution channel 7''' are connected to form an eighth flow channel. Further, a connecting channel 9''' which is connected to an upstream side of the reaction bath section 3 of the seventh flow channel from the eighth flow channel is provided. On the sixth flow channel, a valve 12A''' and a valve 12C''' are provided upstream of the connecting channel 9''' and downstream of the connecting channel 9''', respectively. On the fifth flow channel, a valve 12B''' and a valve 12D''' are provided upstream of a portion connected to the connecting channel 9''' and downstream of the portion connected to the connecting channel 9''', respectively. A blocking reagent (another treatment solution) is supplied to a port 10A''' provided on the blocking reagent supply channel 5''', and the buffer solution is supplied to a port 10B''' provided on the buffer solution supply channel 6'''.

As such, the first, third, fifth, and seventh flow channels all have substantially the same configuration, and the second, fourth, sixth, and eighth flow channels all have substantially the same configuration. Therefore, the members on each flow channel of the same configuration are represented by the same reference numbers with additional symbols ', ", and '''. However, the portions connected to the reaction bath section 3 on the third, fifth, and seventh flow channels pass through another layer (a layer different from the plane in FIG. 10, for example, the back surface of the substrate) so as not to be joined with other flow channels. Thus, they are indicated with broken lines in FIG. 10. Further, the temperature adjusting section 13 is not provided on the third, fifth, and seventh flow channels.

In the present embodiment, the binding reaction between the ligand and the analyte can be performed after extracting air from each flow channel while preventing mixing of fluids, by performing substantially the same treatment as that in FIGS. 3 and 5 to each flow channel pair, that is, to each combination of the supply channels for the sample solution or treatment solution 5, 5', 5", and 5'", with the buffer solution supply channels 6, 6', 6", and 6'" at an appropriate order. Thus, the analysis can be performed with high reliability.

Third Embodiment

Next, a microchip for analysis 41 of a third embodiment of the invention shown in FIGS. 11 and 12 and the analysis system will be described. The same elements as those of the microchip for analysis 1 or 40 of the first or second embodiment are represented by the same reference numerals, and the descriptions thereof will be omitted.

The above-described microchip for analysis 40 of the second embodiment is such that the analysis of the sample solution is prepared by allowing the ligand solution or the treatment solution for pre-treatment solution (SAM reagent and blocking reagent) to flow in the reaction bath section 3 through each flow channel in the microchip for analysis 40. However, the microchip for analysis 40 is disadvantageous in that the configuration has defects since there are 8 flow channels, and the flow channels for the buffer solution (the first, third, fifth, and seventh flow channels) overlap one another, which results in causing the microchip for analysis 40 to be large. Thus, in the present embodiment, the configuration defects are reduced by eliminating the overlap of the flow channels for the buffer solution (the first, third, fifth, and seventh flow channels).

Figure 11:
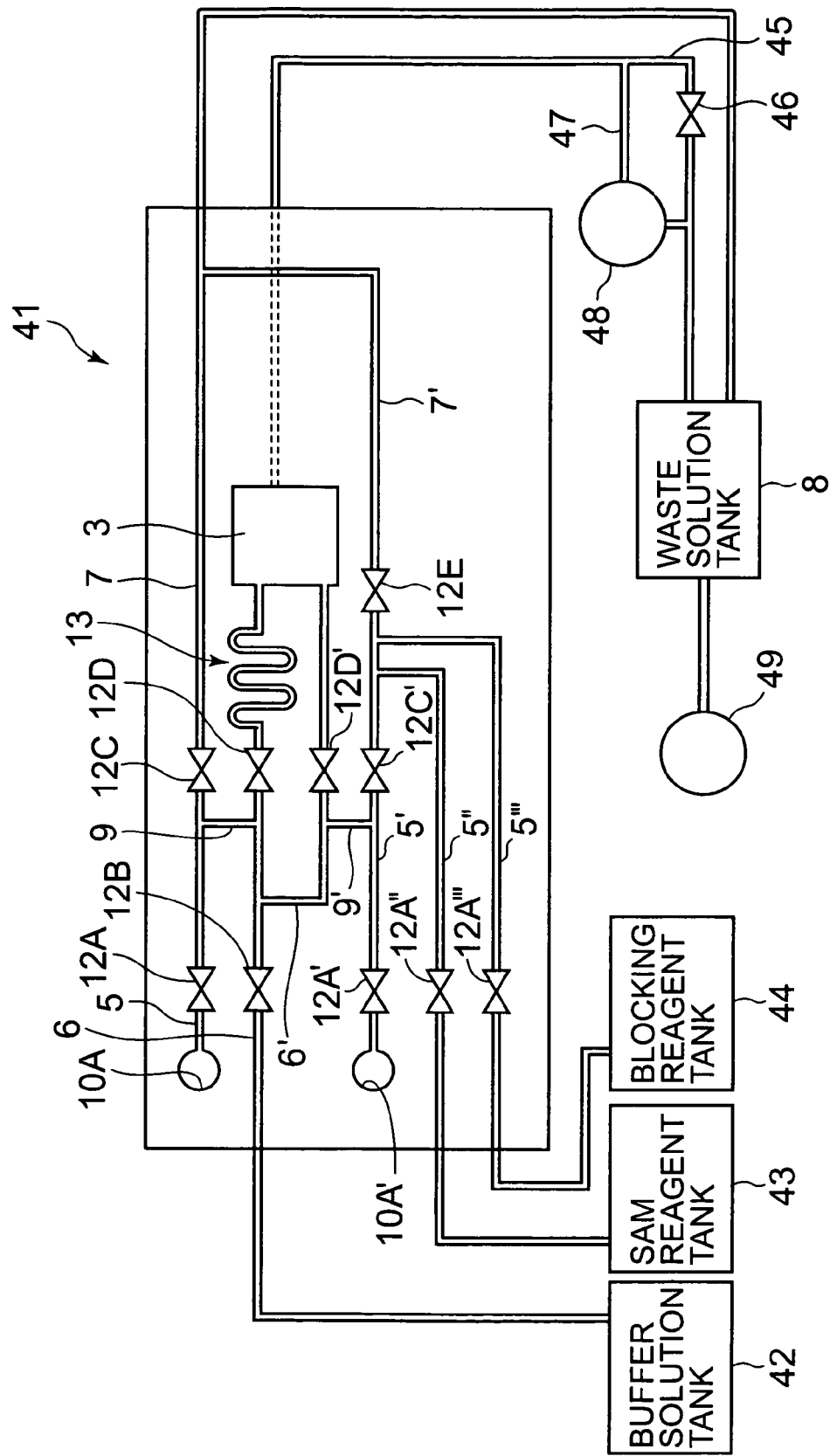
FIG. 11 is a schematic plan view of a microchip for analysis and elements thereof in an analysis apparatus according to a third embodiment of the invention.
Figure 12:
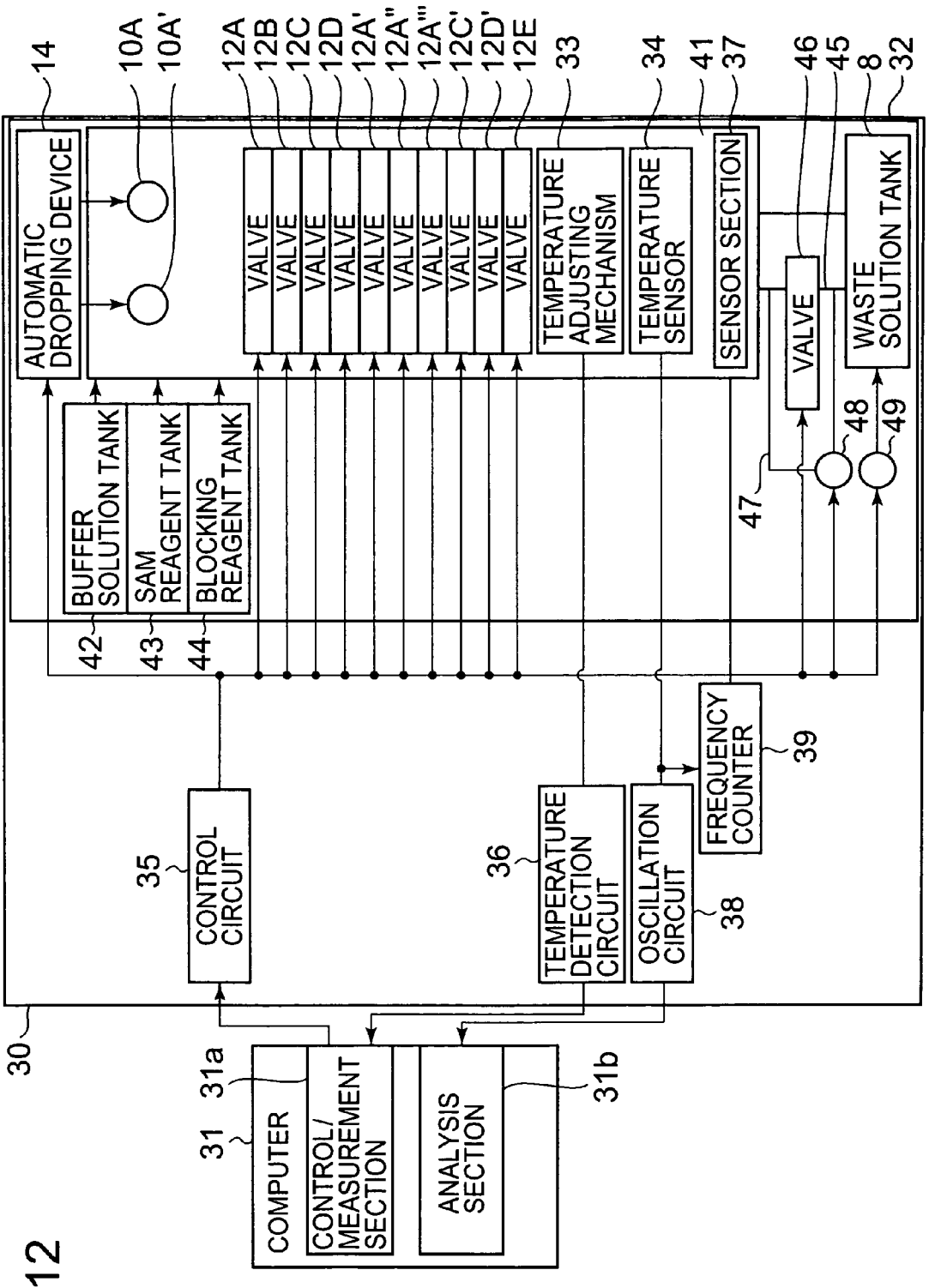
FIG. 12 is a block diagram of an analysis system having the microchip for analysis shown in FIG. 11.

As shown in FIG. 11, the microchip for analysis 41 of the present embodiment has, in addition to the configuration of the microchip for analysis 1 shown in FIGS. 1 and 2, another buffer solution flow channel 6', which is branched from the buffer solution supply channel 6 to reach the reaction bath section 3, and the reaction bath section 3 which are connected to form a third flow channel, a ligand solution supply channel (treatment solution supply channel) 5' and a waste solution channel 7' which are connected to form a fourth flow channel, and a connecting channel (connecting channel for treatment solution) 9' which is connected to an upstream side of the reaction bath section 3 of the third flow channel from the fourth flow channel. On the fourth flow channel, a valve 12A' and a valve 12C' are provided upstream of the connecting channel 9' and downstream of the connecting channel 9', respectively. On the third flow channel, a valve 12D' is provided downstream of a portion to which the connecting channel 9 is connected. Another buffer solution flow channel 6' of the third flow channel is joined with the buffer solution supply channel 6 at an upstream side of a portion to which the connecting channel 9' is connected, which is connected to a valve 12B. The waste solution channels 7 and 7' are joined and connected to the external waste solution tank 8.

To the fourth flow channel of the present embodiment, an SAM reagent supply channel (another treatment solution supply channel) 5" and a blocking reagent supply channel (another treatment solution supply channel) 5'" are connected. The SAM reagent supply channel 5" and the blocking reagent supply channel 5'" respectively have a valve 12A" and a valve 12A'" provided thereon. Further, on the fourth flow channel, valves 12C' and 12E are disposed on both sides of a portion, to which the SAM reagent supply channel 5" and the blocking reagent supply channel 5'" are connected, respectively.

Further, the buffer solution supply channel 6 of the present embodiment is connected to an external buffer solution tank 42, the SAM reagent supply channel 5" is connected to an external SAM reagent tank 43, and the blocking reagent supply channel 5'" is connected to an external blocking reagent tank 44. This is to simplify the configuration and the process by storing a relatively large amount of the buffer solution, the SAM reagent, and the blocking reagent in the tanks 42 to 44 outside the microchip for analysis 41. Since these reagents need not be replaced in different analyses with different analyte and/or ligand, the settings of the flow channels for the reagents need not be renewed whenever the analysis is performed. These tanks 42 to 44 also constitute a part of a layer solution section.

Further, in the present embodiment, a portion of the flow channel 45, which starts from the reaction bath section 3 to reach the waste solution tank 8, is branched, and a valve 46 is arranged on the flow channel 45. At the same time, a precision pump 48 is arranged on a bypass flow channel 47. Further, a large capacity pump (low vacuum pump) 49 is connected to the waste solution tank 8. Although the precision tank 48 and the low vacuum pump 49 all are pumps capable of sucking up fluids, the precision tank 49 can be set the flow viscosity (flow rate) precisely as compared to the low vacuum pump 49. The low vacuum pump 49 is capable of sucking up a large amount of the fluid with high efficiency as compared to the precision tank 48.

Figure 13:
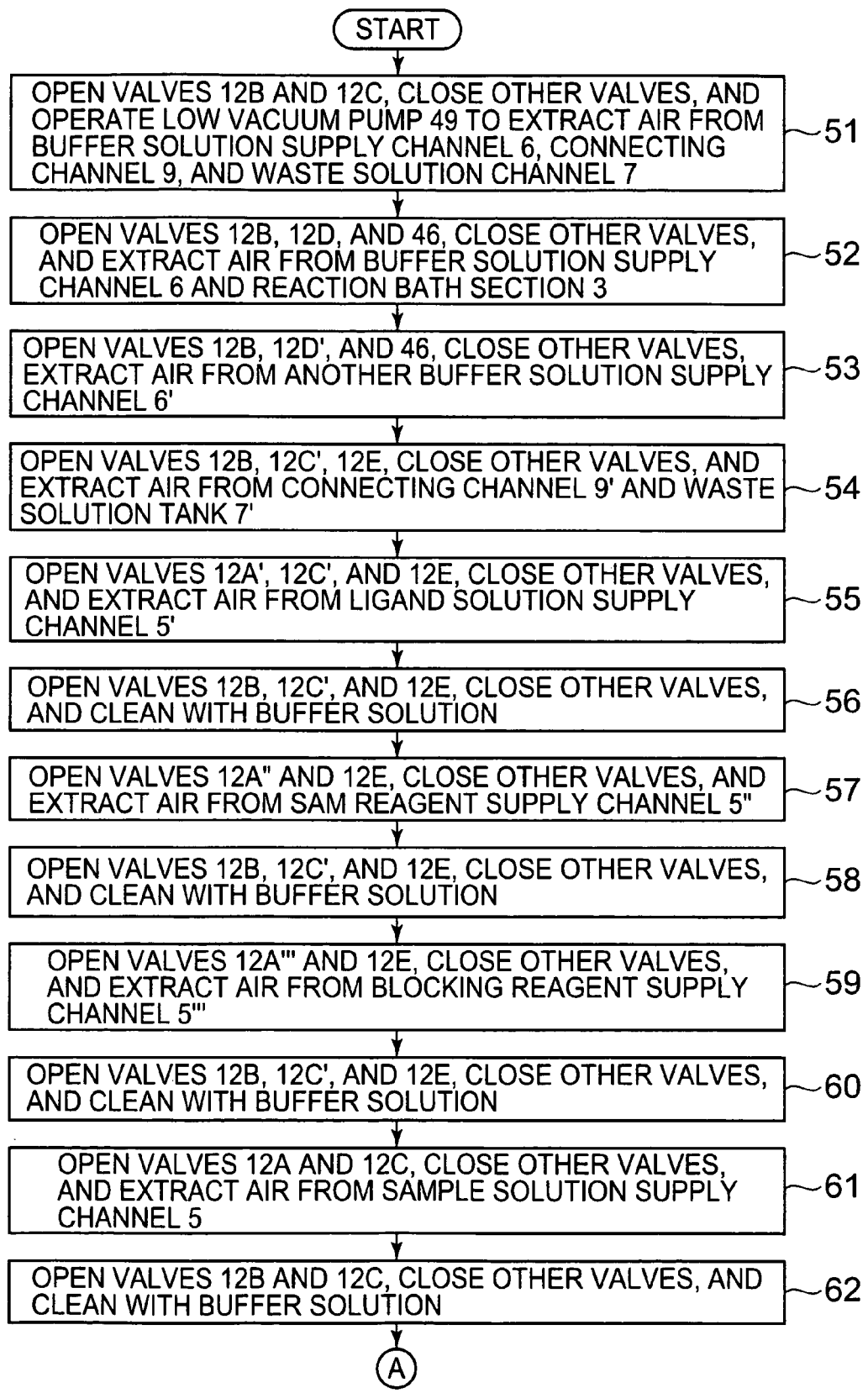
FIG. 13 is a flowchart showing a first half of an analysis method using the analysis apparatus shown in FIG. 11.
Figure 14:
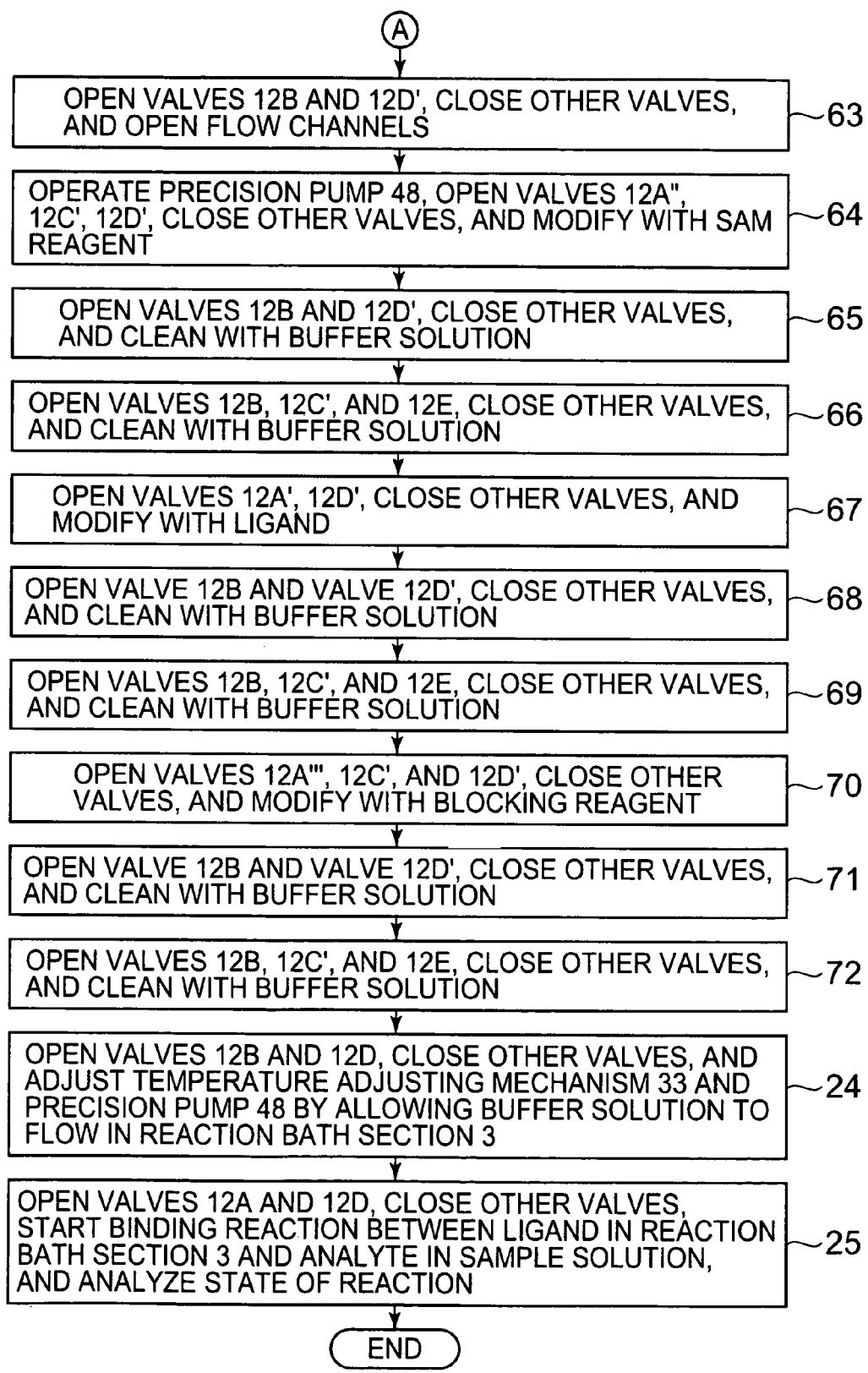
FIG. 14 is a flowchart showing a second half, which is subsequent to the first half shown in FIG. 13, of the analysis method using the analysis apparatus shown in FIG. 11.

An analysis method using the microchip for analysis 41 of the present embodiment and the analysis system as described above will be described with reference to FIGS. 13 to 15.

Figure 15A:
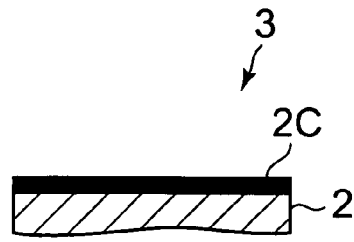
FIGS. 15A-15D are an explanatory view schematically showing the state of a fluid in each flow channel according to the analysis method shown in FIGS. 13 and 14.

The microchip for analysis 41 of the present embodiment is mounted on the mounting section 32 of the analysis apparatus 30, in a state in which the ligand is not modified in the reaction bath section 3 as shown in FIG. 15A. First, the valves 12B and 12C are opened, the low vacuum pump 49 is operated to extract air from the buffer solution supply channel 6, the connecting channel 9, and the waste solution channel 7 by allowing the buffer solution to flow from the buffer solution tank 42 via the buffer solution supply channel 6, the connecting channel 9, and the waste solution channel 7 to the waste solution tank 8 (Step 51).

Next, with the valve 12B open, the valve 12C is closed, and the valve 12D and valve 46 are opened to extract air from the buffer solution supply channel 6 and the reaction bath section 3 by allowing the buffer solution to flow from the buffer solution tank 42 via the buffer solution supply channel 6 and the reaction bath section 3 to the waste solution tank 8 (Step 52). Subsequently, the valve 12D is closed, the valve 12D' is opened, and air is extracted mainly from another buffer solution supply channel 6' by allowing the buffer solution to flow from the buffer solution tank 42 via the buffer solution supply channel 6, another buffer solution supply channel 6', and the reaction bath section 3 to the waste solution tank 8 (Step 53). Then, with valve 12B open, the valve 12D' and valve 46 are closed, and the valve 12C' and valve 12E are opened to extract air mainly from the connecting channel 9' and the waste solution channel 7' by allowing the buffer solution to flow from the buffer solution tank 42 via the buffer solution supply channel 6, another buffer solution supply channel 6', the connecting channel 9', and the waste solution channel 7' to the waste solution tank 8 (Step 54).

Next, with the valve 12C' and the valve 12E open, the valve 12B is closed, and the valve 12A' is opened to extract air mainly from the ligand solution supply channel 5' by allowing the ligand solution to flow from the port 10A' via the ligand solution supply channel 5' and the waste solution channel 7' to the waste solution tank 8 (Step 55). Subsequently, the valve 12A' is again closed, and the valve 12B is opened to suck up the buffer solution from the buffer solution tank 42 via the buffer solution supply channel 6, another buffer solution supply channel 6', the connecting channel 9', and the waste solution channel 7' to the waste solution 8. Then, the downstream side of the connecting channel 9' (mainly the waste solution channel 7') is cleaned with the buffer solution to prevent the ligand solution from remaining behind (Step 56).

Next, with the valve 12E open, the valve 12B and the valve 12C' are closed, and the valve 12A" is opened to extract air mainly from the SMA reagent supply channel 5" by allowing the SAM reagent to flow from the SAM reagent tank 43 via the SAM reagent supply channel 5" and the waste solution channel 7' to the waste solution tank 8 (Step 57). Then, the valve 12A" is closed again, and the valve 12B and the valve 12C' are opened to allow the buffer solution to flow from the buffer solution tank 42 via the buffer solution supply channel 6, another buffer solution supply channel 6', the connecting channel 9', and the waste solution channel 7' to the waste solution tank 8. Then, the waste solution channel 7' is cleaned with the buffer solution to prevent the SAM reagent from remaining behind (Step 58).

Next, with the valve 12E open, the valve 12B and the valve 12C' are closed, and the valve 12A''' is opened to extract air mainly from the blocking reagent supply channel 5''' by allowing the blocking reagent to flow from the blocking reagent tank 44 via the blocking reagent supply channel 5''' and the waste solution channel 7' to the waste solution tank 8 (Step 59). Then, the valve 12A''' is again closed, and the valve 12B and the valve 12C' are opened to allow the buffer solution to flow from the buffer solution tank 42 via the buffer solution supply channel 6, another buffer solution supply channel 6', the connecting channel 9', and the waste solution channel 7' to the waste solution tank 8. Then, the waste solution channel 7' is cleaned with the buffer solution to prevent the blocking reagent from remaining behind (Step 60).

Next, the valve 12B, the valve 12C', and the valve 12E are closed, and the valve 12A and the valve 12C are opened to extract air mainly from the sample solution supply channel 5 by allowing the sample solution to flow from the sample solution introducing port 10A via the sample solution supply channel 5 and the waste solution channel 7 to the waste solution tank 8 (Step 61). Then, the valve 12A is closed and the valve 12B is opened to suck up the buffer solution from the buffer solution tank 42 via the buffer solution supply channel 6, the connecting channel 9, and the waste solution channel 7 to the waste solution tank 8. Then, the waste solution channel 7 is cleaned with the buffer solution to prevent the sample solution from remaining behind (Step 62). Thus, the extraction of air from each flow channel is completed through the steps 51 to 62.

Subsequently, the pretreatment of the reaction bath section 3 to perform the desired analysis is performed. First, the valve 12B and valve 12D' are opened, and all other valves are closed to maintain the flow channel to the bypass flow channel 47 open (Step 63). The step 63 is performed not to generate the flow of any solution, but to prevent an overload in the precision pump 48 from occurring upon the operation of the precision pump 48.

Figure 15B:
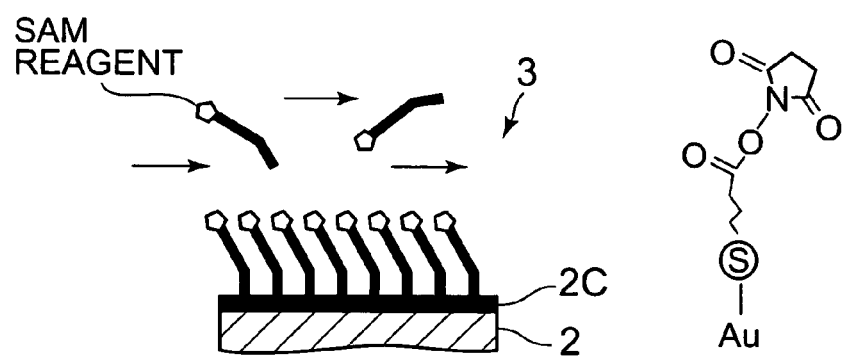

Then, the precision pump 48 is operated, the valves 12A", 12C', and 12D' are opened, and all other valves are closed. In such a manner, the SAM reagent is allowed to flow from the SAM reagent tank 43 through the SAM reagent supply channel 5", the connecting channel 9', another buffer solution supply channel 6' (the portion at a downstream side of the connecting channel 9'), and the reaction bath section 3 to the waste solution tank 8, so as to modify the gold layer 2C which constitutes the base layer of the reaction bath section 3 with the SAM reagent, as shown in FIG. 15B (Step 64). Further, FIG. 15B shows an example of the composition of the SAM reagent. Next, with the valve 12D' open, the valve 12A" and the valve 12C' are closed, and the valve 12B is opened to allow the buffer solution to flow from the buffer solution tank 42 via the buffer solution supply channel 6, another buffer solution supply channel 6', and the reaction bath section 3 to the waste solution tank 8 (Step 65). Then, with the valve 12B open, the valve 12D' is closed, and the valve 12C' and the valve 12E are opened to allow the buffer solution to flow from the buffer solution tank 42 via the buffer solution supply channel 6, another buffer solution supply channel 6', the connecting channel 9', and the waste solution supply channel 7' to the waste solution tank 8 (Step 66). Through the steps 65 and 66, all of the SAM reagents except the portion modified with the gold layer 2c in the reaction bath section 3 is purged with the buffer solution to prevent them from remaining behind.

Figure 15C:
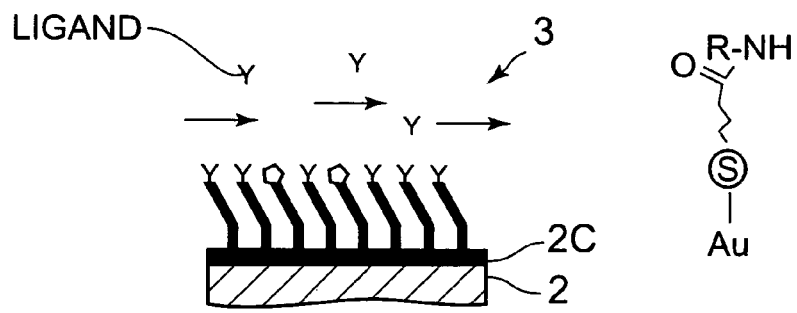

Next, the valve 12A' and the valve 12D' are opened, and all other valves are closed to allow the ligand solution to flow from the port 10A' through the ligand solution supply channel 5', the connecting channel 9', and the reaction bath section 3 to the waste solution tank 8, so as to modify the SAM reagent on the gold layer 2c of the reaction bath section 3 with the ligand, as shown in FIG. 15C (Step 67). Further, FIG. 15C shows an example of the composition of the SAM reagent mounted with the ligand. Then, with the valve 12D' open, the valve 12A' is closed, and the valve 12B is opened to suck up the buffer solution from the buffer solution tank 42 through the buffer solution supply channel 6, another buffer solution supply channel 6', and the reaction bath section 3 to the waste solution tank 8 (Step 68). Then, with the valve 12B open, the valve 12D' is closed, and the valve 12C' and the valve 12E are opened to suck up the buffer solution from the buffer solution tank 42 via the buffer solution supply channel 6, another buffer solution supply channel 6', the connecting channel 9', and the waste solution channel 7' to the waste solution tank 8 (Step 69). Through the steps 68 and 69, all of the ligand except the portion modifying the SAM reagent on the gold layer 2c in the reaction bath section 3 is purged with the buffer solution to prevent them from remaining behind.

Figure 15D:
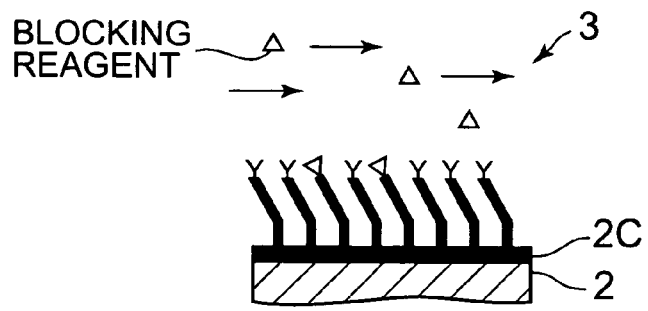

Next, the valves 12A''', 12C', and 12D' are opened, and all other valves are closed. In such a manner, the blocking reagent is allowed to flow from the blocking reagent tank 44 through the blocking reagent supply channel 5''', the connecting channel 9', another buffer solution supply channel 6' (the portion at a downstream side of the connecting channel 9'), and the reaction bath section 3 to the waste solution tank 8, so as to modify the portion of the SAM reagent on the gold layer 2c in the reaction bath section 3, where the ligand is not modified, with the blocking reagent, as shown in FIG. 15D (Step 70). Next, with the valve 12D' open, the valve 12A''' and the valve 12C' are closed, and the valve 12B is opened to suck up the buffer solution from the buffer solution tank 42 through the buffer solution supply channel 6, another buffer solution supply channel 6', and the reaction bath section 3 to the waste solution tank 8 (Step 71). Then, with the valve 12B open, the valve 12D' is closed, and the valve 12C' and the valve 12E are opened to suck up the buffer solution from the buffer solution tank 42 through the buffer solution supply channel 6', another buffer solution supply channel 6', the connecting channel 9', and the waste solution channel 7' to the waste solution tank 8 (Step 72). Through the steps 71 and 72, all blocking reagent except the portion modifying the SAM reagent on the gold layer 2c in the reaction bath section 3 is purged with the buffer solution to prevent them from remaining behind.

Through the above-described steps 64 to 72, the pretreatment (modification with the ligand) of the reaction bath section 3 is completed, which results in a state equivalent to that shown in FIG. 4A. However, in FIG. 4, the SAM reagent and the blocking reagent are not shown.

Thus, with the valve 12B open, the valve 12C' and the valve 12E are closed, and the valve 12D is opened to suck up the buffer solution from the buffer solution tank 42 through the buffer solution supply channel 6 and the reaction bath section 3 to the waste solution tank 8. In such a manner, while the buffer solution is allowed to flow through the reaction bath section 3, the temperature adjusting mechanism 33 (see FIG. 12) in the temperature adjusting section 13, such as a heater, is set to bring the buffer solution to a predetermined temperature. At the same time, the suction power of the precision pump 48 is adjusted to allow the buffer solution to flow at a predetermined flow rate (Step 24).

Then, like the first embodiment, the valve 12B is closed to stop the supply of the buffer solution, and simultaneously the valve 12A is opened to supply the sample solution through the sample solution supply channel 5 and the connecting channel 9 to the reaction bath section 3, so as to bring into the binding reaction between the ligand in the reaction bath section 3 and the analyte in the sample solution (see FIG. 4B) for analysis of the reaction state (Step 25). Further, subsequently, as shown in FIG. 4C, it is also possible to detect the dissociation state of a part of the bound analyte-ligand by allowing the buffer solution to flow through the reaction bath section 3.

Moreover, according to the flow channel configuration of the present embodiment shown in FIG. 11, both the joining section of the SAM reagent supply channel 5" and the joining section of the blocking reagent supply channel 5''', with respect to the fourth flow channel which has the ligand solution supply channel 5' and the waste solution channel 7', are arranged near the waste solution tank 8 rather than the connecting channel 9' (at a downstream side of the flow of the ligand solution). Therefore, the SAM reagent and the blocking reagent remaining in the fourth flow channel can be effectively purged with the buffer solution.

Further, in the present embodiment, it is not necessary to control strictly the flow velocity or flow rate of each fluid during the extraction of air and the subsequent cleaning of the flow channels. Accordingly, an efficient suction can be performed with a large capacity low vacuum pump 49. As regards the pretreatment (modification with SAM reagent, ligand, blocking reagent) affecting the binding reaction and the supply of the sample solution to be analyzed, the suction can be performed using the precision pump 48 with high precision. In such a manner, efficiency of the air extraction operation can be enhanced and the analysis can be performed with high reliability. However, in the steps 63 to 72 and 24 to 25 shown in FIG. 14, the precision pump 48 is operated so as to perform the respective treatments, while the low vacuum pump 49 is still operated. This is because there is a risk that, when the low vacuum pump 49 is stopped of operation, the waste solution tank 8 is brought into the atmospheric pressure, which results in a backflow of the solution from the low vacuum pump 49 to the waste solution tank 8 and a backflow of the solution from the waste solution tank 8 to the microchip for analysis (to the valves 12C and 12E).

In the present embodiment, since the ligand solution, the SAM reagent, and the blocking reagent are used as the treatment solution for the pretreatment for analysis, the supply channels 5', 5" and 5''' have been formed respectively, but, if necessary, the number of such a treatment solution can be increased. For example, when it is considered that there is no unreacted SAM reagent not modified with the ligand, the blocking reagent supply channel 5''' can be omitted. Further, when the SAM reagent has been preliminarily modified in the reaction bath section 3, the SAM reagent supply channel 5" can be omitted. In such cases, the corresponding steps can be appropriately omitted. However, typically, a configuration in which the SAM reagent supply channel 5" and the blocking reagent supply channel 5''' are formed, while the ligand solution supply channel 5' does not exist, is not considered.

Further, in the above described embodiments, each fluid is allowed to flow to the waste solution tank 8 in each step of extracting air. However, the purpose of each step lies in discharging air from the flow channels in the microchip for analysis, and thus the operation of extracting air may be terminated at the time when the air in the microchip for analysis has been removed. That is, in these steps, the suction may be stopped at the time when there is still air present in a duct which links the microchip for analysis with the waste solution tank 8. Typically, there are many cases where the capacity of the duct outside the microchip for analysis is of a size 10 times greater than the capacity of each flow channel in the microchip for analysis. When the solutions are allowed to flow to the waste solution tank 8, the solutions are wasted in large quantities. Thus, in order to inhibit the wasting of these solutions, in particular, the sample solution, it is contemplated to terminate the suction at the time when air in each flow channel of the microchip for analysis is forced out of the microchip for analysis.

As described above, according to the invention, impairing of the reliability of analysis due to the analyte in the residual sample solution can be prevented by setting appropriately the timing and direction of each of the fluids passing through the connecting channel and thus preventing the sample solution from remaining after the treatment of extracting air, in particular, in the connecting channel 9. This can be made possible by using the connecting channel 9 which allows fluids to flow alternately in the counter directions. When the connecting channel 9 has a sufficient length, the effect of preventing the fluid from mixing in each flow channel is high. Further, it is also possible to perform the step of extracting air with high efficiency while the fluids are prevented from remaining or mixing. Thus, the operation can be suppressed from being complicated. Further, the adjustment of the temperature or the flow velocity (flow rate) of the buffer solution may be performed, while the buffer solution actually is allowed to flow in the reaction bath section 3. Then, if the step of allowing the sample solution to be analyzed to flow is started without blocking the flow therein, the temperature and flow velocity (flow rate) of the sample solution can be appropriately maintained as far as possible. As a result, the analysis can be smoothly performed with high reliability.

What is claimed is:

1. A microchip for conducting an analysis, the microchip comprising: a substrate; a sample solution supply channel that is formed in the substrate and that supplies a sample solution containing a first substance; a reaction bath section that is formed in the substrate and that receives the first substance and a second substance that reacts with the first substance in the reaction bath section; a buffer solution supply channel that is formed in the substrate and that supplies a buffer solution which does not substantially react with the first and second substances; a waste solution channel that is formed in the substrate and that discharges the sample and buffer solutions to an exterior of the substrate; a first flow channel formed in the substrate and to which the buffer solution supply channel and the reaction bath section are connected, the first flow channel having first and second valves controllable between open and closed states and disposed between the buffer solution supply channel and the reaction bath section; a second flow channel formed in the substrate and to which the sample solution supply channel and the waste solution channel are connected, the second flow channel having third and fourth valves controllable between open and closed states and disposed between the sample solution supply channel and the waste solution channel; and a connecting channel formed in the substrate and connecting the first flow channel to the second flow channel, the connecting channel being disposed at an upstream side of the reaction bath section and the waste solution channel and at a downstream side of the sample solution supply channel and the buffer solution supply channel, and the first and third valves being disposed at an upstream side of the connecting channel and the second and fourth valves being disposed at a downstream side of the connecting channel such that by selectively opening and closing the first, second, third and fourth valves, the buffer solution from the buffer solution supply channel flows first into the reaction bath section at a preselected speed followed by the flow of the sample solution from the sample solution supply channel into the reaction bath section, via the connecting channel, at the preselected speed so that the first and second substances react in the reaction bath section.

2. A microchip for conducting an analysis according to claim 1; wherein in the open states of the first and fourth valves and the closed state of the second and third valves, the buffer solution flows from the buffer solution supply channel to the waste solution channel.

3. A microchip for conducting an analysis according to claim 1; wherein the sample solution supply channel is provided with a sample solution introducing port through which the sample solution is dropped and supplied, and the buffer solution supply channel is provided with a buffer solution introducing port through which the buffer solution is dropped and supplied.

4. A microchip for conducting an analysis according to claim 1; wherein the waste solution channel is connected to a waste solution tank which is provided exteriorly of the substrate.

5. A microchip for conducting an analysis according to claim 4; wherein the reaction bath section is connected to the waste solution tank.

6. A microchip for conducting an analysis according to claim 4; wherein the waste solution tank is connected to a pump which draws a fluid from at least one of the waste solution channel and the reaction bath section.

7. A microchip for conducting an analysis according to claim 1; further comprising a temperature adjusting section provided in the substrate to adjust a temperature of each of the buffer solution and the sample solution.

8. A microchip for conducting an analysis according to claim 7; wherein the temperature adjusting section is disposed upstream of the reaction bath section and downstream of the first and second valves.

9. A microchip for conducting an analysis according to claim 7; wherein the temperature adjusting section is disposed in the reaction bath section.

10. A microchip for conducting an analysis according to claim 7; wherein the temperature adjusting section is disposed upstream of the reaction bath section.

11. A microchip for conducting an analysis according to claim 10; wherein the temperature adjusting section is provided downstream of the first and second valves in the first flow channel.

12. A microchip for conducting an analysis according to claim 1; further comprising:
a third flow channel formed in the substrate and to which another buffer solution supply channel that is formed in the substrate and supplies the buffer solution and the reaction bath section are connected; and
a fourth flow channel formed in the substrate and to which a treatment solution supply channel that is formed in the substrate and that supplies a treatment solution and the waste solution channel are connected;
wherein the third flow channel is connected to the fourth flow channel by a second connecting channel formed in the substrate and disposed at an upstream side of the reaction bath section.

13. A microchip for conducting an analysis according to claim 12; wherein the third flow channel comprises a flow channel which is branched from the buffer solution supply channel to which the first flow channel is connected to reach the reaction bath section.

14. A microchip for conducting an analysis according to claim 12; wherein the second connecting channel comprises a flow channel via which the buffer solution flows from the another buffer solution supply channel to the waste solution channel and via which the treatment solution flows from the fourth flow channel to the reaction bath section.

15. A microchip for conducting an analysis according to claim 12; wherein the fourth flow channel is provided with valves which are respectively disposed upstream and downstream of the second connecting channel, and the third flow channel is provided with valves which are respectively disposed upstream and downstream of a portion to which the another connecting channel is connected.

16. A microchip for conducting an analysis according to claim 12; wherein a fifth flow channel for the treatment solution is formed in the substrate and connected to the fourth flow channel.

17. An analysis system comprising:
a microchip according to claim 1 for conducting an analysis;
a mounting section on which the microchip is mounted;
a solution transfer section by which at least the sample solution and the buffer solution flows in the microchip mounted on the mounting section;
a sensor section that detects a reaction between the first and second substances in the reaction bath section; and
an analysis section that analyzes the detection result from the sensor section.

18. An analysis system according to claim 17; wherein the sensor section is built in the reaction bath section of the microchip.

19. An analysis system according to claim 17; further comprising a computer that includes the analysis section and that controls opening and closing operations of the first, second, third and fourth valves in the first and second flow channels of the microchip.

20. A microchip for conducting an analysis according to claim 1; wherein the sample solution supply channel is provided with a sample solution introducing port through which the sample solution is dropped and supplied, and the buffer solution supply channel is connected to a buffer solution tank which stores the buffer solution.

21. A microchip for conducting an analysis, the microchip comprising: a substrate having a reaction bath section, a first flow channel to which are connected the reaction bath section and a buffer solution supply channel that supplies a buffer solution, a second flow channel to which are connected a sample solution supply channel that supplies a sample solution containing a first substance and a discharge channel that discharges the sample and buffer solutions to an exterior of the substrate, a connecting channel connecting the first flow channel to the second flow channel, first and second valves controllable between open and closed states and disposed in the first flow channel on opposite sides of the connecting channel and between the buffer solution supply channel and the reaction bath section, and third and fourth valves controllable between open and closed states and disposed in the second flow channel on opposite sides of the connecting channel and between the sample solution supply channel and the discharge channel, the reaction bath section being positioned relative to the connecting channel and the first, second, third, and fourth valves so that by selectively opening and closing the first, second, third and fourth valves, the buffer solution from the buffer solution supply channel flows first into the reaction bath section at a preselected speed followed by the flow of the sample solution from the sample solution supply channel into the reaction bath section, via the connecting channel, at the preselected speed so that the first substance reacts with a second substance in the reaction bath section.

22. A microchip according to claim 21; wherein the substrate comprises a pair of plate members laminated over one another.

23. A microchip according to claim 21; wherein the channel that discharges the sample and buffer solutions is connected to a waste solution tank provided exteriorly of the substrate.

24. A microchip according to claim 21; further comprising a temperature adjusting section provided in the substrate to adjust a temperature of each of the buffer solution and the sample solution.

25. A microchip according to claim 24; wherein the temperature adjusting section is disposed in the reaction bath section.

26. A microchip according to claim 24; wherein the temperature adjusting section is disposed upstream of the reaction bath section.

27. A microchip according to claim 24; wherein the temperature adjusting section is provided downstream of the valves provided in the first flow channel.

28. An analysis system comprising:
a microchip according to claim 21 for conducting an analysis;
a mounting section on which the microchip is mounted;
a solution transfer section by which at least the sample solution and the buffer solution flow in the microchip mounted on the mounting section;
a sensor section that detects a reaction between the first and second substances in the reaction bath section; and
an analysis section that analyzes the detection result from the sensor section.

29. An analysis system according to claim 28; wherein the sensor section is built in the reaction bath section of the microchip.

30. An analysis system according to claim 28; further comprising a computer that includes the analysis section and that controls opening and closing operations of the first, second, third and third valves in the first and second flow channels of the microchip.

31. A microchip for conducting an analysis, the microchip comprising: a substrate having a reaction bath section, a first flow channel to which are connected the reaction bath section and a buffer solution supply channel that supplies a buffer solution, a second flow channel to which are connected a sample solution supply channel that supplies a sample solution containing a first substance and a discharge channel that discharges the sample and buffer solutions to an exterior of the substrate, a connecting channel connecting the first flow channel to the second flow channel, first and second valves disposed in the first flow channel on opposite sides of the connecting channel and between the buffer solution supply channel and the reaction bath section, and third and fourth valves disposed in the second flow channel on opposite sides of the connecting channel and between the sample solution supply channel and the discharge channel, the first, second, third and fourth valves being controllable between open and closed states to extract air from the first flow channel, second flow channel and connecting channel so that by subsequently selectively opening and closing the first, second, third and fourth valves, the buffer solution from the buffer solution supply channel flows first into the reaction bath section at a preselected speed followed by the flow of the sample solution from the sample solution supply channel into the reaction bath section, via the connecting channel, at the preselected speed so that the first substance reacts with a second substance in the reaction bath section.

32. A microchip for conducting an analysis according to claim 31; further comprising a temperature adjusting section provided in the substrate to adjust a temperature of each of the buffer solution and the sample solution, the temperature adjusting section being disposed upstream of the reaction bath section and downstream of the first and second valves.

33. An analysis system comprising:
a microchip according to claim 31 for conducting an analysis;
a mounting section on which the microchip is mounted;
a solution transfer section by which at least the sample solution and the buffer solution flows in the microchip mounted on the mounting section;
a sensor section that detects a reaction between the first and second substances in the reaction bath section; and
an analysis section that analyzes the detection result from the sensor section.

* * * * *